(12) United States Patent
Kyosuna et al.

(10) Patent No.: US 11,392,014 B2
(45) Date of Patent: Jul. 19, 2022

(54) PROJECTION DEVICE, INTERFACE DEVICE, AND PROJECTION METHOD

(71) Applicant: NEC Corporation, Tokyo (JP)

(72) Inventors: Satoshi Kyosuna, Tokyo (JP); Hirofumi Tsuda, Tokyo (JP); Satoshi Komatsu, Tokyo (JP); Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 16/772,023

(22) PCT Filed: Dec. 15, 2017

(86) PCT No.: PCT/JP2017/045024
§ 371 (c)(1),
(2) Date: Jun. 11, 2020

(87) PCT Pub. No.: WO2019/116526
PCT Pub. Date: Jun. 20, 2019

(65) Prior Publication Data
US 2021/0216001 A1 Jul. 15, 2021

(51) Int. Cl.
*G03B 21/00* (2006.01)
*G03B 21/14* (2006.01)
*H04N 9/31* (2006.01)

(52) U.S. Cl.
CPC ......... *G03B 21/005* (2013.01); *G03B 21/142* (2013.01); *H04N 9/3102* (2013.01)

(58) Field of Classification Search
CPC .... G03B 21/005; G03B 21/142; G03B 21/00; G03B 21/14; G03B 21/16; G03B 21/2033;
(Continued)

(56) References Cited

U.S. PATENT DOCUMENTS

2005/0063032 A1 3/2005 Igasaki et al.
2009/0128872 A1 5/2009 Christmas et al.
(Continued)

FOREIGN PATENT DOCUMENTS

JP H02-238391 A 9/1990
JP 2004-534661 A 11/2004
(Continued)

OTHER PUBLICATIONS

International Search Report corresponding to PCT/JP2017/045024, 2 pages, dated Feb. 13, 2018.
(Continued)

*Primary Examiner* — Michael E Teitelbaum

(57) ABSTRACT

A projection device comprises: a spatial light modulator having a display unit whereon a pattern corresponding to a display image is presented; a light source arranged to irradiate the display unit with emission light; a projection optical system arranged on the optical path of the reflected light of the emission light incident on the display unit and projecting projection light with the high order component included in the reflected light removed therefrom; and a projection control unit that causes the display unit to present a composite image that combines an image formed by a virtual lens that focuses the emission light incident on the display unit at a first focus position with the pattern corresponding to the display image, and controls the light source so that the display unit is irradiated with the emission light.

15 Claims, 21 Drawing Sheets

(58) Field of Classification Search
CPC ............ G03B 21/2066; G03B 21/2073; H04N 9/3102; H04N 9/3179; H04N 9/312; G02B 27/18; G02B 27/42; G02B 27/4205; G02B 2027/0107; G02B 2027/015; G02B 27/0172; G03H 1/2294; G03H 2001/0825; G03H 2001/2207; G03H 1/0808; G03H 1/2205
See application file for complete search history.

(56) References Cited

U.S. PATENT DOCUMENTS

| | | | |
|---|---|---|---|
| 2013/0265622 | A1 | 10/2013 | Christmas et al. |
| 2017/0339378 | A1 | 11/2017 | Okumura |

FOREIGN PATENT DOCUMENTS

| | | | |
|---|---|---|---|
| JP | 2006-026909 | A | 2/2006 |
| JP | 2009-536747 | A | 10/2009 |
| JP | 2016-176996 | A | 10/2016 |
| JP | 2017-142506 | A | 8/2017 |
| WO | WO-2003/036368 | A1 | 5/2003 |
| WO | WO-2016/098281 | A1 | 6/2016 |
| WO | WO-2016/129279 | | 8/2016 |
| WO | WO-2016/170765 | A1 | 10/2016 |
| WO | WO-2017/013862 | A1 | 1/2017 |

OTHER PUBLICATIONS

Written Opinion of the International Searching Authority with English Translation, dated Feb. 13, 2018, 15 pages.
Japanese Office Action for JP Application No. 2019-558819 dated Dec. 22, 2020 with English Translation.

Fig.11
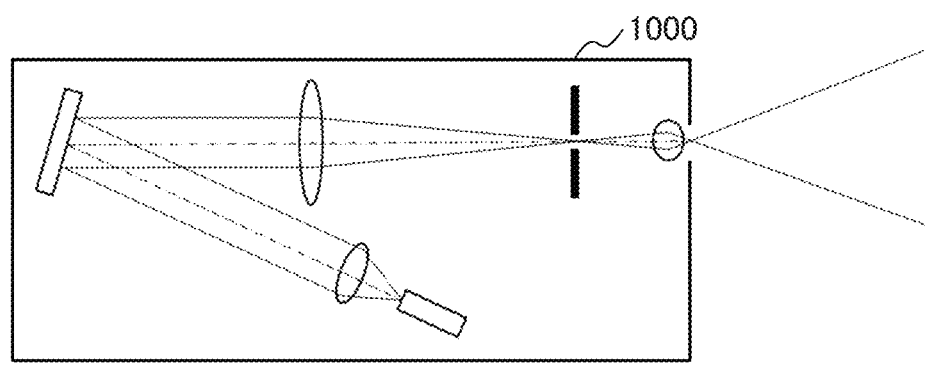
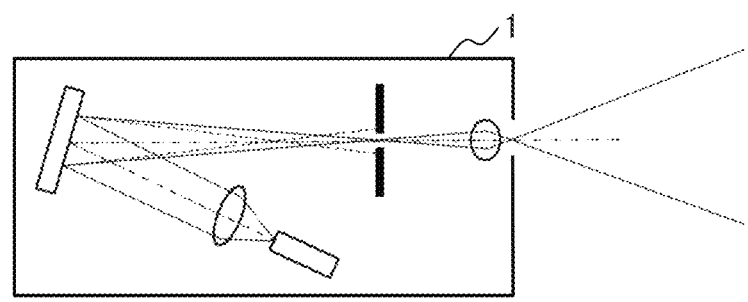

PROJECTION DEVICE, INTERFACE DEVICE, AND PROJECTION METHOD

CROSS-REFERENCE TO RELATED APPLICATIONS

This application is a national stage application of International Application No. PCT/JP2017/045024 entitled "PROJECTION DEVICE, INTERFACE DEVICE, AND PROJECTION METHOD," filed on Dec. 15, 2017, the disclosures of which is hereby incorporated by reference in its entirety.

TECHNICAL FIELD

The present invention relates to a projection device, an interface device, and a projection method. In particular, the present invention relates to a projection device, an interface device, and a projection method, using a spatial light modulator of a phase modulation type.

BACKGROUND ART

In recent years, development of an interface device in which a projector and a camera are combined has progressed. The interface device achieves an interactive operation by capturing, with the camera, an operation content performed by a user with respect to an image projected from the projector, and recognizing the operation content of the user.

PTL 1 discloses an interface device in which a projector and a camera are combined. The device of PTL 1 includes a projection unit using a spatial light modulation element of a phase modulation type. The device of PTL 1 displays a desired image on a projected surface by displaying, on a display area of a modulation element, a phase distribution for forming an image, and projecting reflected light of laser light incident on the display area.

PTL 2 discloses a device for applying an optical gradient force in such a way as to form a plurality of light traps for operating fine particles. PTL 2 discloses a technique of converging a plurality of beamlets at a position between an encoded diffractive optical lens and a transfer lens by using a diffractive optical element in which a virtual lens is encoded. The device of PTL 2 is able to form, through the transfer lens, a plurality of light traps within an operation focus area by guiding beamlets converged by the virtual lens in such a way as to overlap at an opening portion behind a focus lens.

PTL 3 discloses a water depth measurement device including a transmission light optical system for adjusting a divergent angle of light to be emitted from a pulse light generation source, and transmitting the light through water.

CITATION LIST

Patent Literature

[PTL 1] International Publication No. WO2016/098281

[PTL 2] Japanese Translation of PCT International Application Publication No. 2004-534661

[PTL 3] Japanese Unexamined Patent Application Publication No. H2-238391

SUMMARY OF INVENTION

Technical Problem

The device of PTL 1 can achieve a wearable interface device. In order to achieve a wearable interface device, it is desirable to miniaturize a projection device and an imaging device as much as possible.

Miniaturization of an imaging device has been achieved to such an extent that the imaging device can be mounted in a wearable interface device by technical development for mounting the imaging device in mobile equipment and the like. However, miniaturization of a projection device has constraints, since an internal space for disposing mounted components while avoiding a light path is necessary. Reducing a weight has also constraints, since it is difficult to reduce the number of indispensable components such as a lens.

The device of PTL 2 is able to guide a plurality of beamlets converged by a virtual lens into an operation focus area by using a diffractive optical element in which the virtual lens is encoded. Reducing the number of lenses of a projection device by a virtual lens may achieve miniaturization of a device, and reduction of the number of components. However, in the device of PTL 2, members such as a transfer lens and a beam splitter for guiding beamlets to an opening portion of a focus lens are indispensable. Therefore, there is a problem that, even with use of the technique of PTL 2, it is difficult to miniaturize a projection device to such an extent as to achieve a wearable interface device.

In order to solve the above-described issues, an object of the present invention is to provide a projection device in which the number of components is reduced, and miniaturization is achieved.

Solution to Problem

A projection device according to one aspect of the present invention includes: a spatial light modulator including a display unit for displaying a pattern associated with a display image; a light source disposed in such a way as to irradiate emission light to the display unit of the spatial light modulator; a projection optical system disposed on an optical path of reflected light of the emission light incident on the display unit of the spatial light modulator, and configured to project projection light in which a high-order component included in the reflected light is removed; and a projection control unit for controlling the light source in such a way as to display, on the display unit of the spatial light modulator, a composite image acquired by combining a virtual lens image for collecting the emission light incident on the display unit of the spatial light modulator at a first light collecting position, and the pattern associated with the display image, and irradiate the emission light to the display unit of the spatial light modulator.

An interface device according to one aspect of the present invention includes: a projection unit provided with a spatial light modulator including a display unit for displaying a pattern associated with a display image, a light source disposed in such a way as to irradiate emission light to the display unit of the spatial light modulator, and a projection optical system disposed on an optical path of reflected light of the emission light incident on the spatial light modulator, and configured to project projection light in which a high-order component included in the reflected light is removed; an imaging unit for capturing a display area of the display image, and generating image data of the display area; and a control unit for controlling the light source in such a way as to display, on the display unit of the spatial light modulator, a composite image acquired by combining a virtual lens image for collecting the emission light incident on the display unit of the spatial light modulator at a first light collecting position, and the pattern associated with the display image, and irradiate the emission light to the display unit of the spatial light modulator, controlling the imaging unit to capture a display area of the display image, and analyzing image data of the display area captured by the imaging unit.

A projection method according to one aspect of the present invention includes, in a projection device provided with a spatial light modulator including a display unit for displaying a pattern associated with a display image, a light source disposed in such a way as to allow incidence of emission light on the display unit of the spatial light modulator, and a projection optical system disposed on an optical path of reflected light of the emission light incident on the spatial light modulator, and configured to project as projection light by removing a high-order component included in the reflected light: generating a composite image acquired by combining a virtual lens image for collecting the emission light incident on the display unit of the spatial light modulator at a first light collecting position, and the pattern associated with the display image; displaying the generated composite image on the display unit of the spatial light modulator; and controlling the light source in such a way as to irradiate the emission light to the display unit of the spatial light modulator.

Advantageous Effects of Invention

The present invention enables providing a projection device in which the number of components is reduced, and miniaturization is achieved.

BRIEF DESCRIPTION OF DRAWINGS

FIG. 11 is a conceptual diagram for comparing the projection device according to the first example embodiment of the present invention with the projection device according to the related art.

EXAMPLE EMBODIMENT

Figure 1:
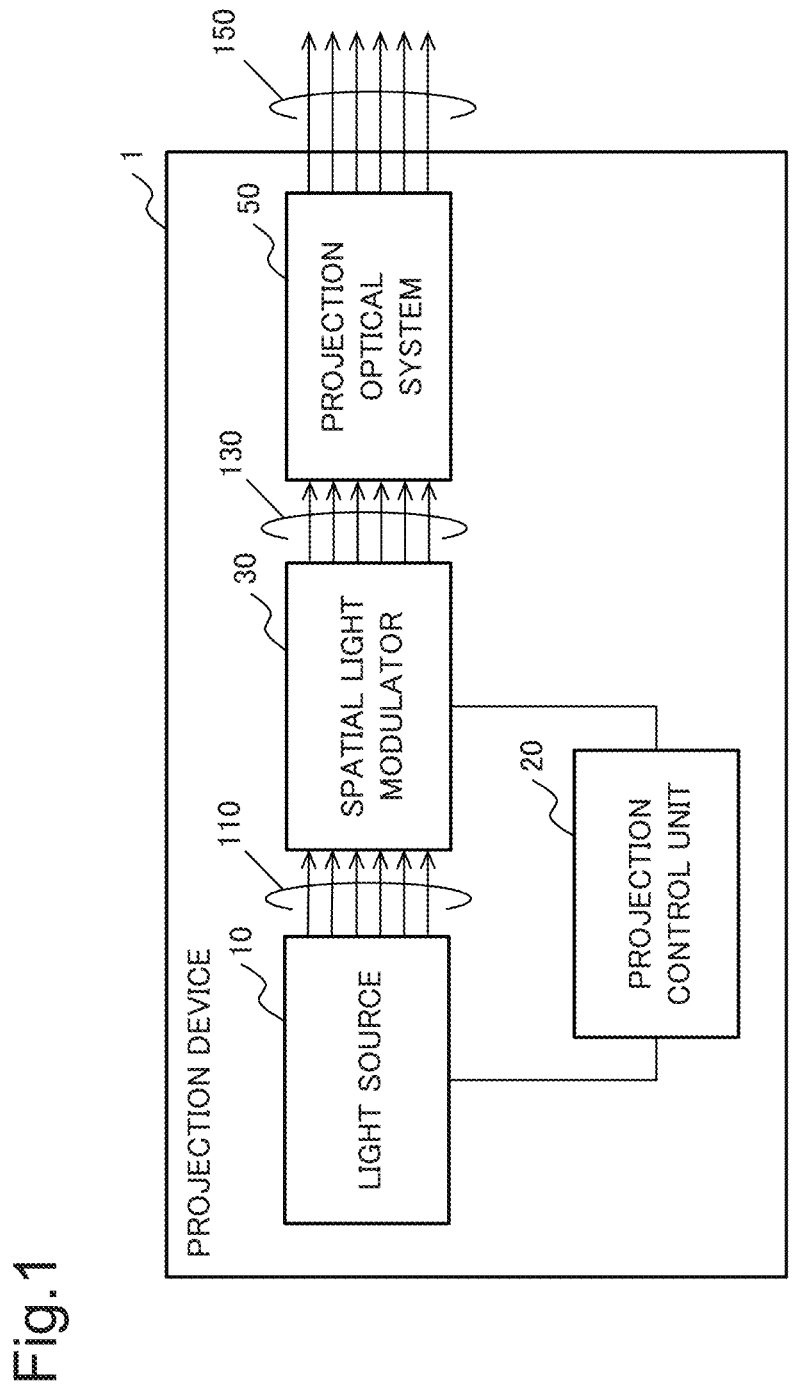
FIG. 1 is a block diagram illustrating a configuration of a projection device according to a first example embodiment of the present invention.

In the following, example embodiments for implementing the present invention are described with reference to the drawings. The example embodiments described in the following include technically preferred limitations for implementing the present invention. However, the scope of the present invention is not limited to the following. In all drawings used in description of the following example embodiments, unless a reason is specifically mentioned, similar elements are indicated with same reference signs. In the following example embodiments, repeated description on a similar configuration/operation may be omitted. In the following example embodiments, a shape, a layout, the number, and the like of connecting lines to be connected to constituent elements are not accurately illustrated, and are conceptually illustrated. In the following example embodiments, a connection relation among constituent elements is not limited to direct connection, and may include indirect connection. In the following example embodiments, directions of arrows in the drawings indicate one example, and do not limit directions of signals and light among blocks.

First Example Embodiment

Figure 2:
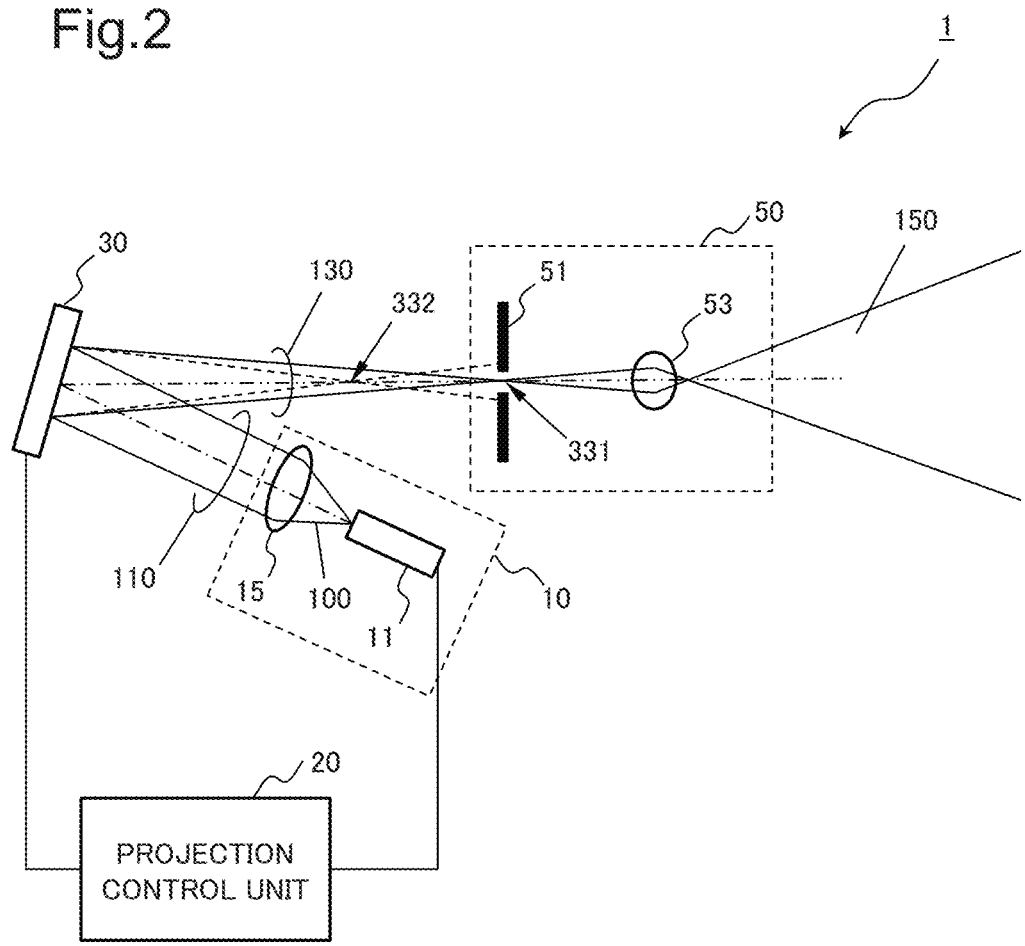
FIG. 2 is a conceptual diagram illustrating a configuration of the projection device according to the first example embodiment of the present invention.

First, a projection device according to a first example embodiment is described with reference to the drawings. FIG. 1 is a block diagram illustrating a configuration of a projection device 1 according to the present example embodiment. FIG. 2 is a conceptual diagram illustrating a relation among constituent elements included in the projection device 1 according to the present example embodiment. FIGS. 1 and 2 are conceptual diagrams, and do not accurately illustrate a positional relation among constituent elements, an irradiation direction of light, and the like. In FIG. 2, a casing of the projection device 1 is omitted, and only an internal configuration thereof is illustrated. Actually, it is configured in such a way that a configuration of the projection device 1 is accommodated inside a casing, and projection light is projectable to the outside through an opening portion or a window portion formed in a part of the casing.

As illustrated in FIG. 1, the projection device 1 includes a light source 10, a projection control unit 20, a spatial light modulator 30, and a projection optical system 50.

The light source 10 emits parallel light 110 toward a display unit of the spatial light modulator 30. As illustrated in FIG. 2, the light source 10 includes an emitting unit 11 for emitting laser light 100 of a specific wavelength, and a collimator 15 for converting the laser light 100 emitted from the emitting unit 11 into the parallel light 110. The laser light 100 emitted from the emitting unit 11 is converted into the parallel light 110 by the collimator 15, and incident on a plane of the display unit of the spatial light modulator 30. In FIG. 2, optical axes of the laser light 100 and the parallel light 110 are indicated by a one-dotted chain line.

For example, the emitting unit 11 is configured to emit the laser light 100 in a visible range. The emitting unit 11 may be configured to emit light in a range other than the visible range, such as an infrared range and an ultraviolet range. The emitting unit 11 may be constituted of a light source such as a light emitting diode, an incandescent light bulb, or a discharge tube. For example, configuring the light emitting unit 11 in such a way as to emit light of a plurality of wavelengths enables to change the color of light to be projected by controlling a wavelength of emission light from the emitting unit 11. Configuring the emitting unit 11 in such a way as to simultaneously emit light of different wavelengths enables to project light composed of a plurality of colors.

The projection control unit 20 is a control system of the projection device 1. The projection control unit 20 controls the light source 10 and the spatial light modulator 30. The projection control unit 20 adjusts an emission timing, an intensity, and the like of the laser light 100 by controlling a driving unit (not illustrated) of the emitting unit 11. The projection control unit 20 adjusts a display timing and a type of a pattern to be displayed on the display unit of the spatial light modulator 30 by controlling the spatial light modulator 30.

The projection control unit 20 causes the display unit of the spatial light modulator 30 to display a pattern (hereinafter, referred to as a composite image) acquired by combining a phase distribution (hereinafter, referred to as a phase image) associated with an image to be displayed on a displayed surface by the projection device 1, and a virtual lens pattern (hereinafter, referred to as a virtual lens image).

The phase image is a pattern in which a phase distribution associated with an image to be displayed on a projected surface is arranged in a tile shape. The virtual lens image is a lens pattern for forming an image to be displayed on a projected surface at a desired focal length. The composite image is a pattern acquired by combining the phase image and the virtual lens image.

Figure 3:
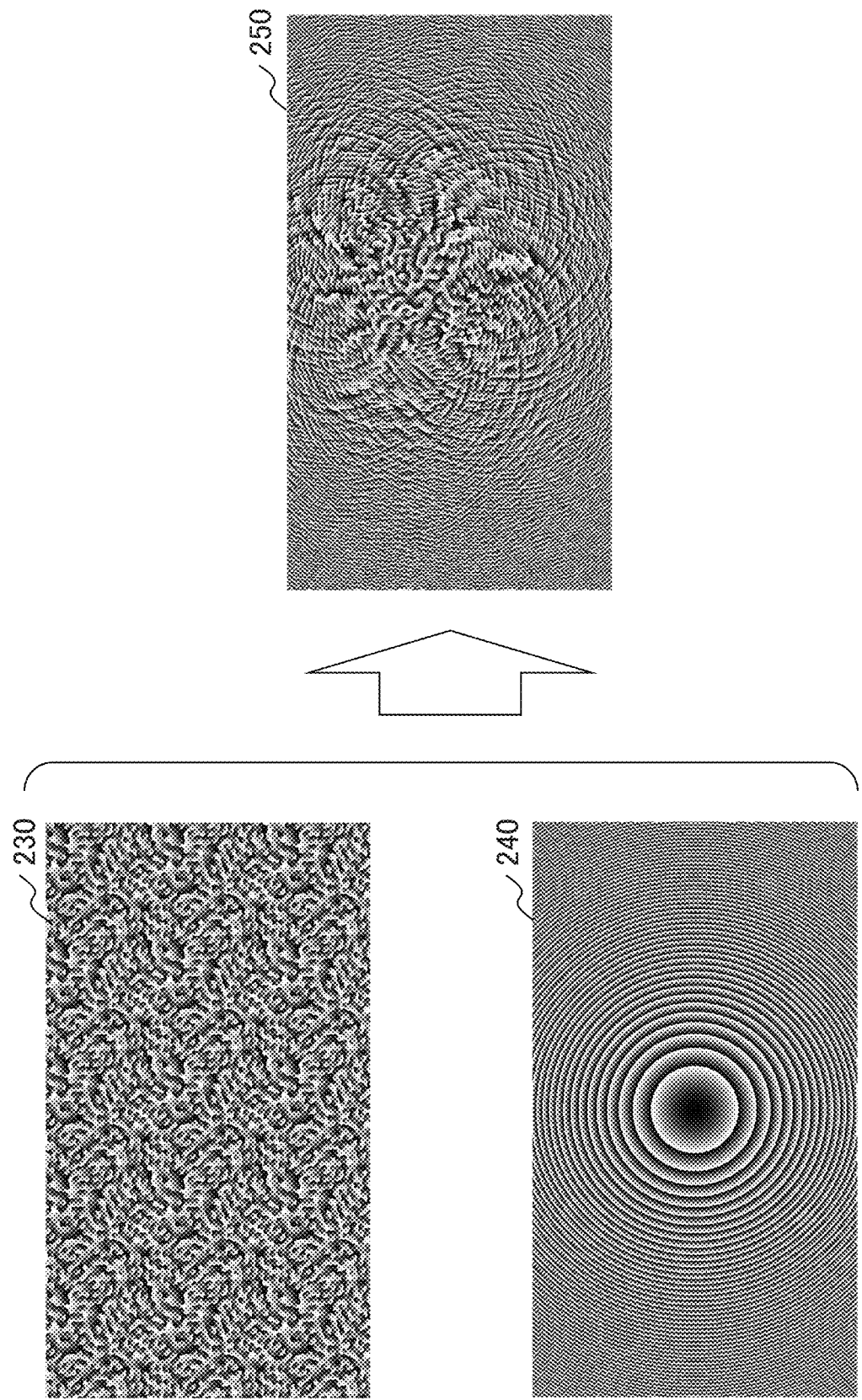
FIG. 3 is a schematic diagram for describing a pattern to be displayed on a display unit of a spatial light modulator of the projection device according to the first example embodiment of the present invention.

FIG. 3 is one example of a phase image 230, a virtual lens image 240, and a composite image 250 to be generated by combining the phase image 230 and the virtual lens image 240. FIG. 3 is one example, and does not limit a phase image, a virtual lens image, and a composite image according to the present example embodiment.

A wavefront of light can be controlled by phase control, as well as diffraction. When a phase is spherically changed, a spherical difference is generated on a wavefront, and a lens effect is generated. Specifically, a virtual lens image is a pattern for generating a lens effect for spherically changing a phase of incident light (parallel light 110) on the display unit of the spatial light modulator 30, and collecting light at a predetermined focal length. A virtual lens image can be controlled independently of a phase distribution image. For example, in order to collect modulated light 130 at a first light collecting position 331, one lens-shaped pattern is displayed on the display unit of the spatial light modulator 30, as a virtual lens image.

The spatial light modulator 30 is controlled by the projection control unit 20, and displays, on the display unit of the spatial light modulator 30, a pattern for generating an image to be displayed on a displayed surface. In the present example embodiment, the parallel light 110 is irradiated to the display unit of the spatial light modulator 30 in a state that a composite image is displayed on the display unit. Reflected light (modulated light 130) of the parallel light 110 irradiated to the display unit of the spatial light modulator 30 propagates toward the projection optical system 50 in a state that the composite image 250 is displayed on the display unit. FIG. 2 illustrates an optical axis of the modulated light 130 by a one-dotted chain line.

The spatial light modulator 30 includes a display unit in which a plurality of reflection units (associated with pixels) capable of changing optical characteristics such as a refractive index are arranged in an array. The spatial light modulator 30 is able to display a desired pattern by controlling optical characteristics of pixels of the display unit. When light is incident in a state that a pattern is displayed on the display unit of the spatial light modulator 30, modulated light in which a spatial distribution is modulated according to optical characteristics of reflection units is emitted. In particular, the present example embodiment describes an example in which a spatial light modulator for modulating a phase among a spatial distribution such as a phase, an amplitude, an intensity, a polarization plane, and a propagating direction of light is used. The spatial light modulator 30 according to the present example embodiment may use a modulator for modulating a spatial distribution such as an amplitude, an intensity, a polarization plane, and a propagating direction of light.

The modulated light 130 is collected at the first light collecting position 331 by a lens effect of a virtual lens image included in a composite image. In the present example embodiment, an aperture 51 is disposed at the first light collecting position 331. Zero-order light included in the modulated light 130 is collected at a second light collecting position 332. The second light collecting position 332 corresponds to a light collecting position of the collimator 15.

As illustrated in FIG. 2, in the present example embodiment, an incident angle of the parallel light 110 is set non-perpendicular to a plane of the display unit of the spatial light modulator 30. Specifically, in the present example embodiment, an optical axis (one-dotted chain line) of the parallel light 110 to be emitted from the light source 10 is set oblique to a plane of the display unit of the spatial light modulator 30. Since setting an optical axis (one-dotted chain line) of the parallel light 110 oblique to the display unit of the spatial light modulator 30 enables to omit a beam splitter for changing a propagating direction of the parallel light 110, it is possible to enhance efficiency.

The present example embodiment describes an example in which an element of a phase modulation type is used as a modulation element of the spatial light modulator 30. The spatial light modulator 30 of a phase modulation type receives incidence of the parallel light 110, and modulates a phase of the incident parallel light 110. Use of a modulation element of a phase modulation type enables to project focus-free projection light. Therefore, it is not necessary to change a focal point for each projection distance, even when projection light is projected to a display area, which is set at a plurality of projection distances. As long as the spatial light modulator 30 can display a desired image on a desired display area by projection light from the projection device 1, an element of a type different from a phase modulation type may be used.

A phase distribution of an image to be displayed on a projected surface is displayed on the display unit of the spatial light modulator 30 of a phase modulation type in response to control of the projection control unit 20. The spatial light modulator 30 is controlled, by the projection control unit 20, in such a way that a parameter for determining a difference between a phase of the parallel light 110 to be irradiated, and a phase of the modulated light 130 reflected on the display unit changes. In this case, the modulated light 130 reflected on the display unit of the spatial light modulator 30 becomes an image in which a sort of diffraction grating forms an agglomerate, and is formed in such a way that light diffracted on the diffraction grating is collected. In the present example embodiment, the modulated light 130 is collected at the first light collecting position 331 by a lens effect of a virtual lens image.

A parameter for determining a difference between a phase of the parallel light 110 to be irradiated to the display unit of the spatial light modulator 30 of a phase modulation type, and a phase of the modulated light 130 to be reflected on the display unit is, for example, a parameter relating to optical characteristics such as a refractive index and an optical path length. For example, the projection control unit 20 changes a refractive index of the display unit of the spatial light modulator 30 by changing a voltage to be applied to the display unit of the spatial light modulator 30. Consequently, the parallel light 110 irradiated to the display unit of the spatial light modulator 30 is diffracted appropriately, based on the diffractive index of the display unit. Specifically, a phase distribution of the parallel light 110 irradiated to the display unit of the spatial light modulator 30 of a phase modulation type is modulated according to optical characteristics of the display unit.

The spatial light modulator 30 is achieved by, for example, a spatial light modulation element using ferroelectricity liquid crystal, homogeneous liquid crystal, vertical orientation liquid crystal, and the like. Specifically, the spatial light modulator 30 can be achieved by liquid crystal on silicon (LCOS) or a micro electro mechanical system (MEMS).

In the spatial light modulator 30 of a phase modulation type, it is possible to concentrate energy on a portion of display information by operating in such a way as to successively switch a portion where projection light is projected. Therefore, as long as an output of the light source 10 is the same, use of the spatial light modulator 30 of a phase modulation type enables to display an image brightly, as compared with an element of another type.

The projection optical system 50 projects, as projection light 150, the modulated light 130 being reflected light on the display unit of the spatial light modulator 30. As long as it is possible to display a desired image on a projected surface, it is also possible to omit one of constituent elements of the projection optical system 50.

As illustrated in FIG. 2, the projection optical system 50 is constituted of the aperture 51 and a projection lens 53. In a case of a general configuration in which a virtual lens image is not used, a Fourier transform lens for guiding the modulated light 130 to an opening portion of the aperture 51 is necessary. In the projection device 1 according to the present example embodiment, a Fourier transform lens is necessary.

The aperture 51 is disposed at the first light collecting position 331 where the modulated light 130 is collected. The aperture 51 has a function of blocking high-order light included in the modulated light 130, and specifying a periphery of an image. For example, an opening portion of the aperture 51 is opened smaller than an image to be formed at the first light collecting position 331, and is set in such a way as to block a periphery of the image at the first light collecting position 331. For example, an opening portion of the aperture 51 is formed into a rectangular shape or a circular shape. It is preferable to dispose the aperture 51 at the first light collecting position 331. However, as long as it is possible to exhibit a function of removing high-order light, the aperture 51 may be deviated from the first light collecting position 331.

The projection lens 53 is an optical lens for enlarging and projecting, as the projection light 150, the modulated light 130, which is converged by a function of a virtual lens included in a composite image displayed on the display unit of the spatial light modulator 30. The projection lens 53 projects the projection light 150 in such a way that an image associated with a phase distribution included in a composite image displayed on the display unit of the spatial light modulator 30 is formed on a projected surface.

When the projection device 1 is used for the purpose of projecting a line drawing such as a simple symbol, the projection light 150 to be projected from the projection optical system 50 is not uniformly irradiated to a projection surface, but is concentratedly irradiated to a portion such as a character, a symbol, and a frame constituting an image. Therefore, the projection device 1 according to the present example embodiment is able to substantially reduce a light amount necessary for displaying an equivalent image, as compared with a general projection device, and suppress an overall light output. Consequently, since the projection device 1 can be constituted of the compact and low-power light source 10, it is possible to lower the output for driving power supply of the light source 10, and reduce overall electric power consumption. Since the projection device 1 according to the present example embodiment is able to omit a Fourier transform lens, further miniaturization of a device is enabled.

The foregoing is description about a schematic configuration of the projection device 1. Subsequently, a configuration of the projection control unit 20 included in the projection device 1 is described in detail with reference to the drawings.

[Projection Control Unit]

Figure 4:
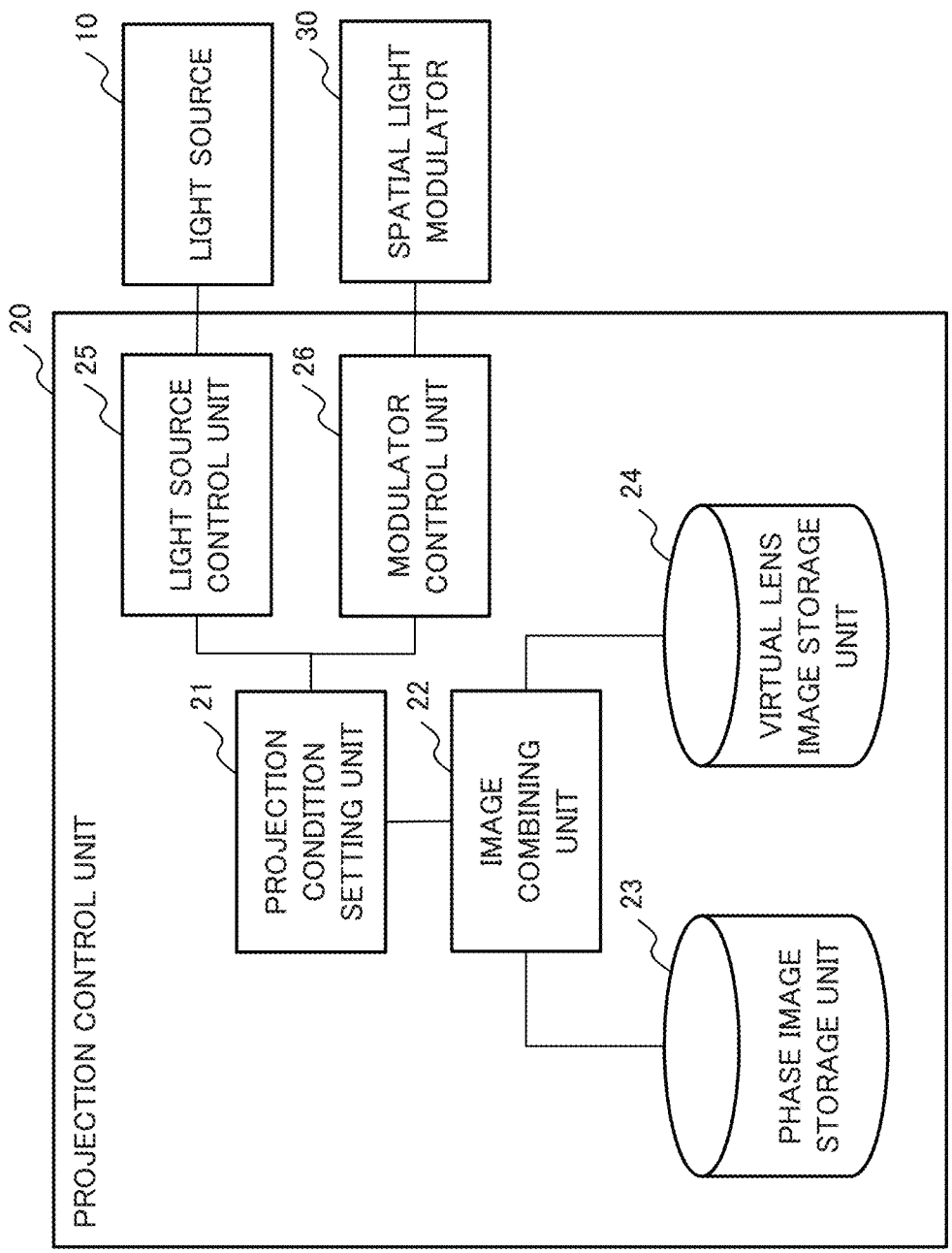
FIG. 4 is a block diagram illustrating a configuration of a projection control unit included in the projection device according to the first example embodiment of the present invention.

FIG. 4 is a block diagram illustrating a configuration of the projection control unit 20. As illustrated in FIG. 4, the projection control unit 20 includes a projection condition setting unit 21, an image combining unit 22, a phase image storage unit 23, a virtual lens image storage unit 24, a light source control unit 25, and a modulator control unit 26.

The projection condition setting unit 21 controls the image combining unit 22, based on a projection condition, and combines a phase image associated with an image to be displayed on a projected surface, and a virtual lens image. The projection condition may be a condition that is programmed in advance, or may be a condition to be set, based on an instruction from an external host system (not illustrated). When a projection condition is set based on an instruction from an external host system, an interface for inputting and outputting data between the external host system and the projection condition setting unit 21 may be provided.

The projection condition setting unit 21 sets an irradiation timing and an intensity of light to be emitted from the light source 10 by controlling the light source control unit 25, and sets a pattern to be displayed on the display unit of the spatial light modulator 30 by controlling the modulator control unit 26.

The image combining unit 22 acquires, from the phase image storage unit 23, a phase image associated with an image to be displayed on a projected surface in response to control of the projection condition setting unit 21, and acquires a virtual lens image from the virtual lens image storage unit 24. The image combining unit 22 generates a composite image by combining the acquired phase image and virtual lens image. The image combining unit 22 outputs the generated composite image to the projection condition setting unit 21. The image combining unit 22 may be configured to output the generated composite image to the modulator control unit 26.

The phase image storage unit 23 stores a phase image associated with an image to be displayed on a projected surface. The phase image stored in the phase image storage unit 23 is a phase distribution associated with a display image to be displayed on a projected surface.

The virtual lens image storage unit 24 stores a virtual lens image. The virtual lens image stored in the virtual lens image storage unit 24 has a lens effect for collecting the modulated light 130 at the first light collecting position 331. The virtual lens image storage unit 24 may store a plurality of virtual lens images according to a focal length.

The light source control unit 25 drives a driving unit (not illustrated) of the emitting unit 11 according to setting of the projection condition setting unit 21, and causes the emitting unit 11 to emit the laser light 100.

The modulator control unit 26 drives a driver for changing a pattern to be displayed on the display unit of the spatial light modulator 30 according to setting of the projection condition setting unit 21, and changes the pattern to be displayed on the display unit of the spatial light modulator 30.

The foregoing is description about a configuration of the projection control unit 20.

[Virtual Lens]

The virtual lens is described by way of a specific example. FIGS. 5 to 9 are conceptual diagrams for describing a virtual lens image. Virtual lens images, phase images, and composite images illustrated in FIGS. 5 to 9 are one example, and do not limit the scope of the present example embodiment.

Figure 5:
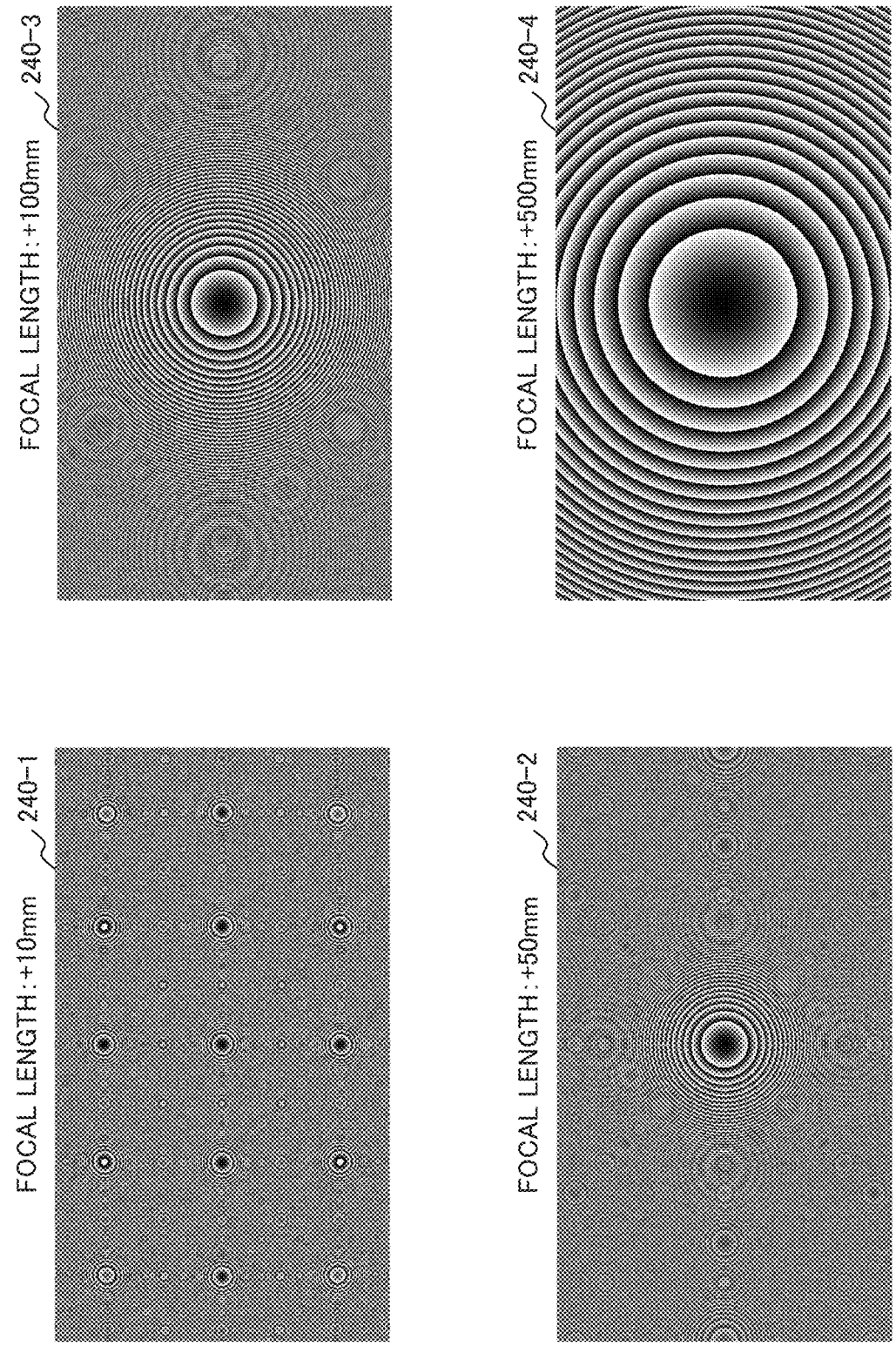
FIG. 5 is a schematic diagram for describing a difference for each focal length of a virtual lens image to be used in the projection device according to the first example embodiment of the present invention.

FIG. 5 is a conceptual diagram illustrating a virtual lens image for each focal length. FIG. 5 illustrates a virtual lens image 240-1 in which a focal length is +10 millimeters (hereinafter, described as mm), a virtual lens image 240-2 in which a focal length is +50 mm, a virtual lens image 240-3 in which a focal length is +100 mm, and a virtual lens image 240-4 in which a focal length is +500 mm.

Use of the virtual lens image 240-1 enables to collect light at a position of a focal length: +10 mm from the display unit of the spatial light modulator 30. Use of the virtual lens image 240-2 enables to collect light at a position of a focal length: +50 mm from the display unit of the spatial light modulator 30. Use of the virtual lens image 240-3 enables to collect light at a position of a focal length: +100 mm from the display unit of the spatial light modulator 30. Use of the virtual lens image 240-4 enables to collect light at a position of a focal length: +500 mm from the display unit of the spatial light modulator 30.

The virtual lens images 240-1 to 240-4 have concentric circular shapes, since they are away from one another each by $2\pi$. However, the virtual lens images 240-1 to 240-4 have a continuous phase change in terms of calculation. Densities of concentric circles of the virtual lens images 240-1 to 240-4 change according to a curvature of a virtual lens. Focal lengths of the virtual lens images 240-1 to 240-4 can be optionally changed by changing a curvature of a lens.

FIGS. 6 to 9 illustrate examples in which composite images 250-1 to 250-4 are formed by using the phase image 230 and the virtual lens images 240-1 to 240-4.

Figure 6:
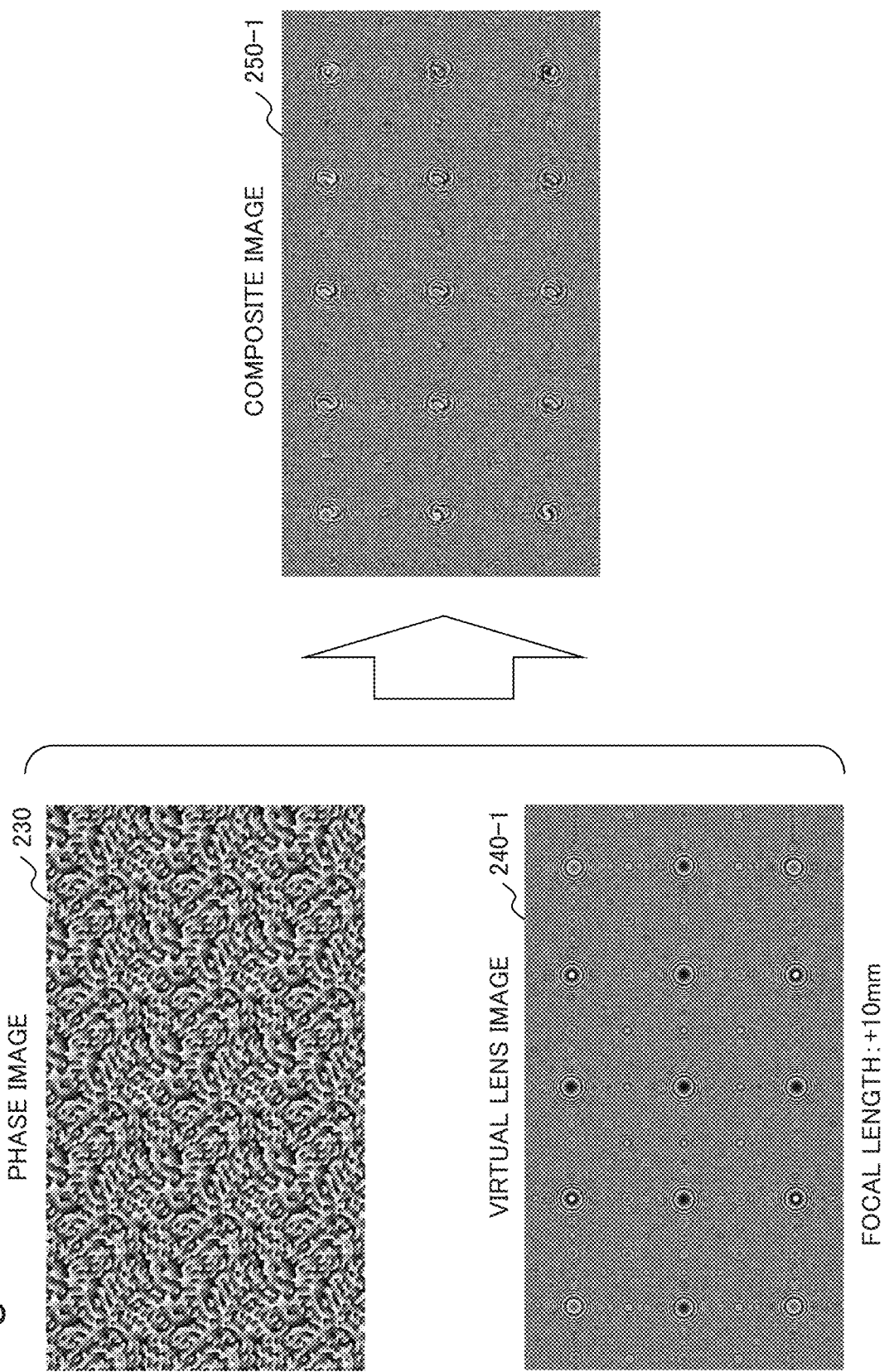
FIG. 6 is a conceptual diagram illustrating one example of a composite image (focal length: +10 mm) to be displayed on the display unit of the spatial light modulator of the projection device according to the first example embodiment of the present invention.
Figure 7:
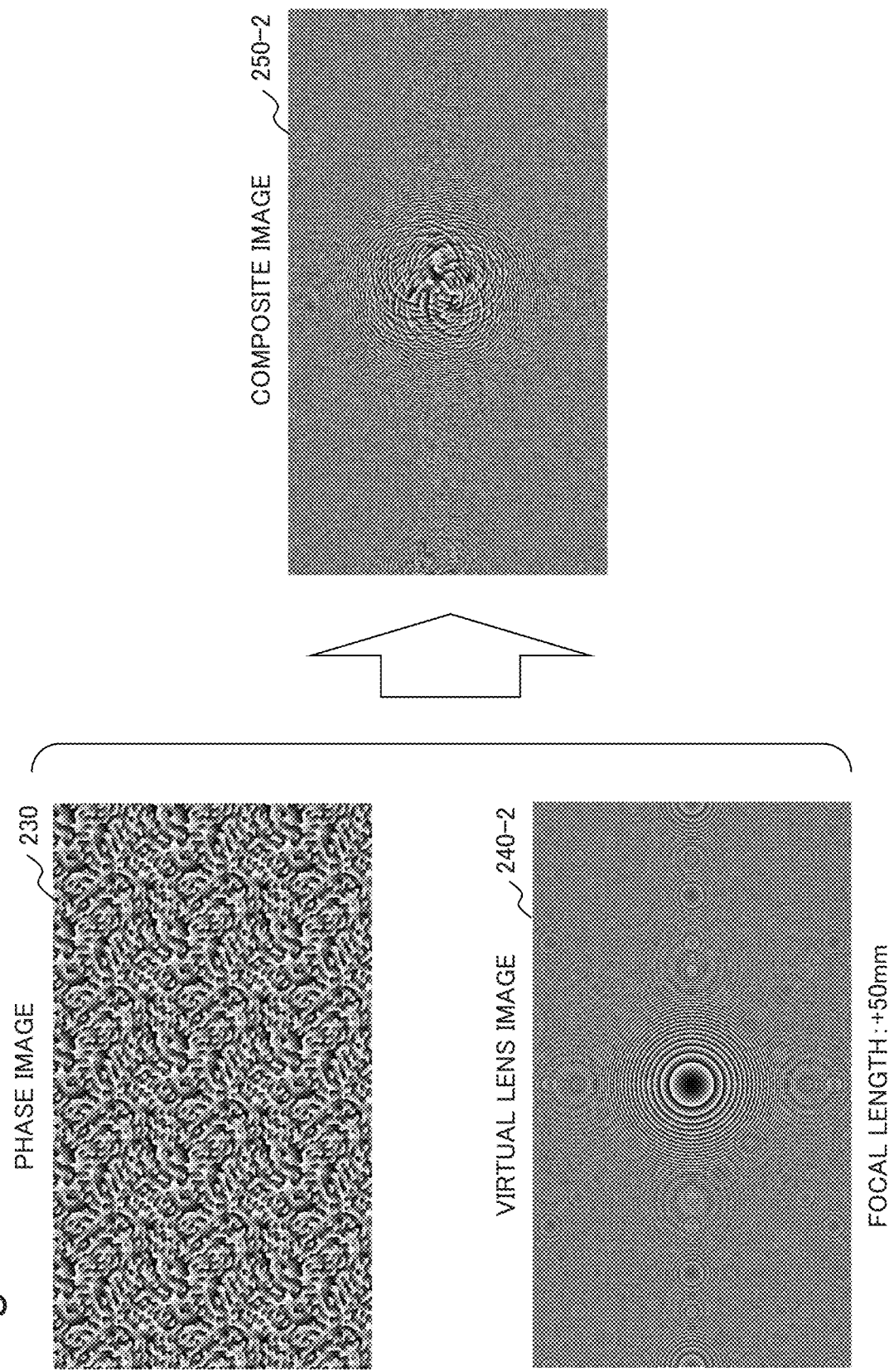
FIG. 7 is a conceptual diagram illustrating one example of a composite image (focal length: +50 mm) to be displayed on the display unit of the spatial light modulator of the projection device according to the first example embodiment of the present invention.
Figure 8:
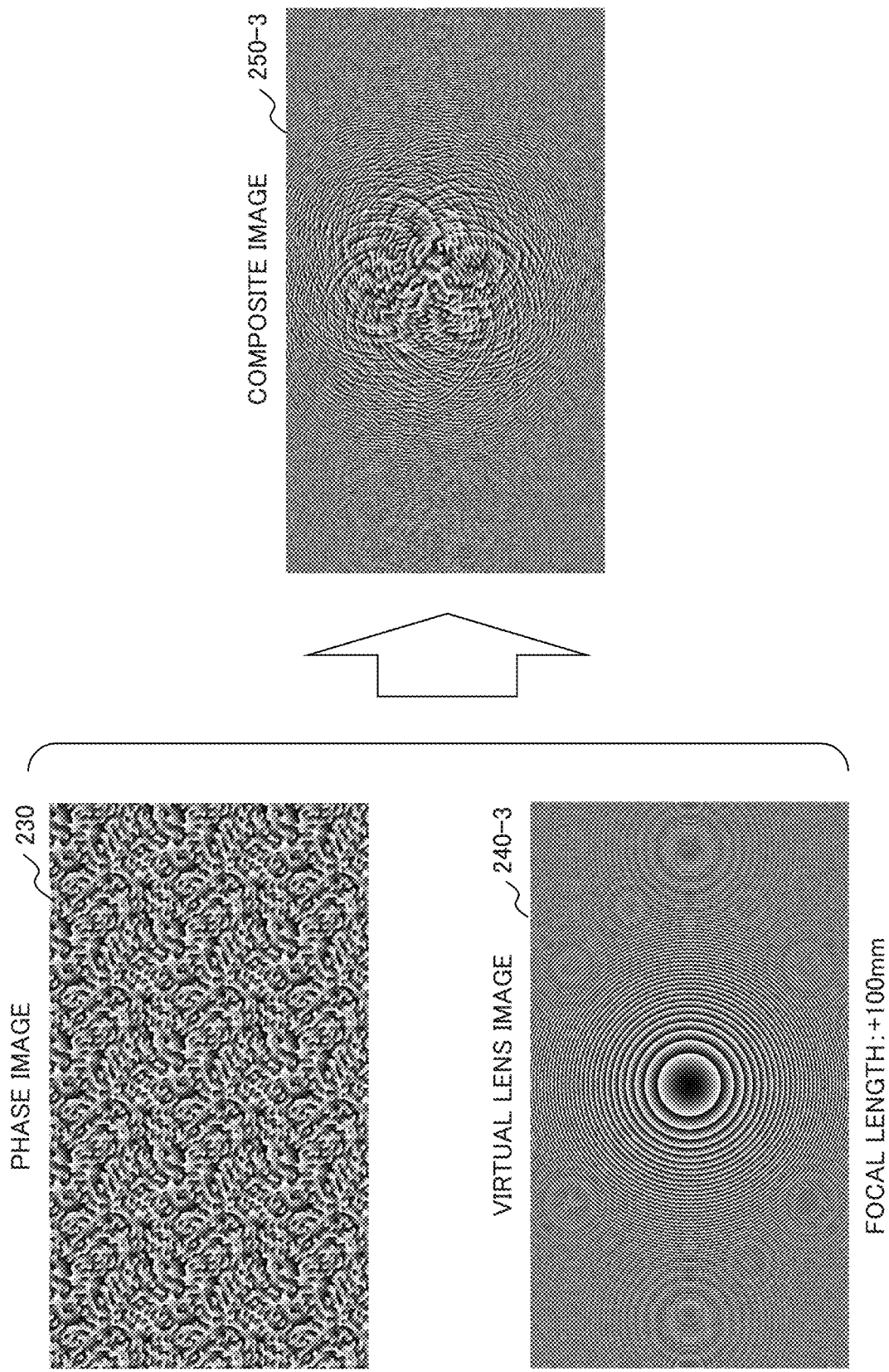
FIG. 8 is a conceptual diagram illustrating one example of a composite image (focal length: +100 mm) to be displayed on the display unit of the spatial light modulator of the projection device according to the first example embodiment of the present invention.
Figure 9:
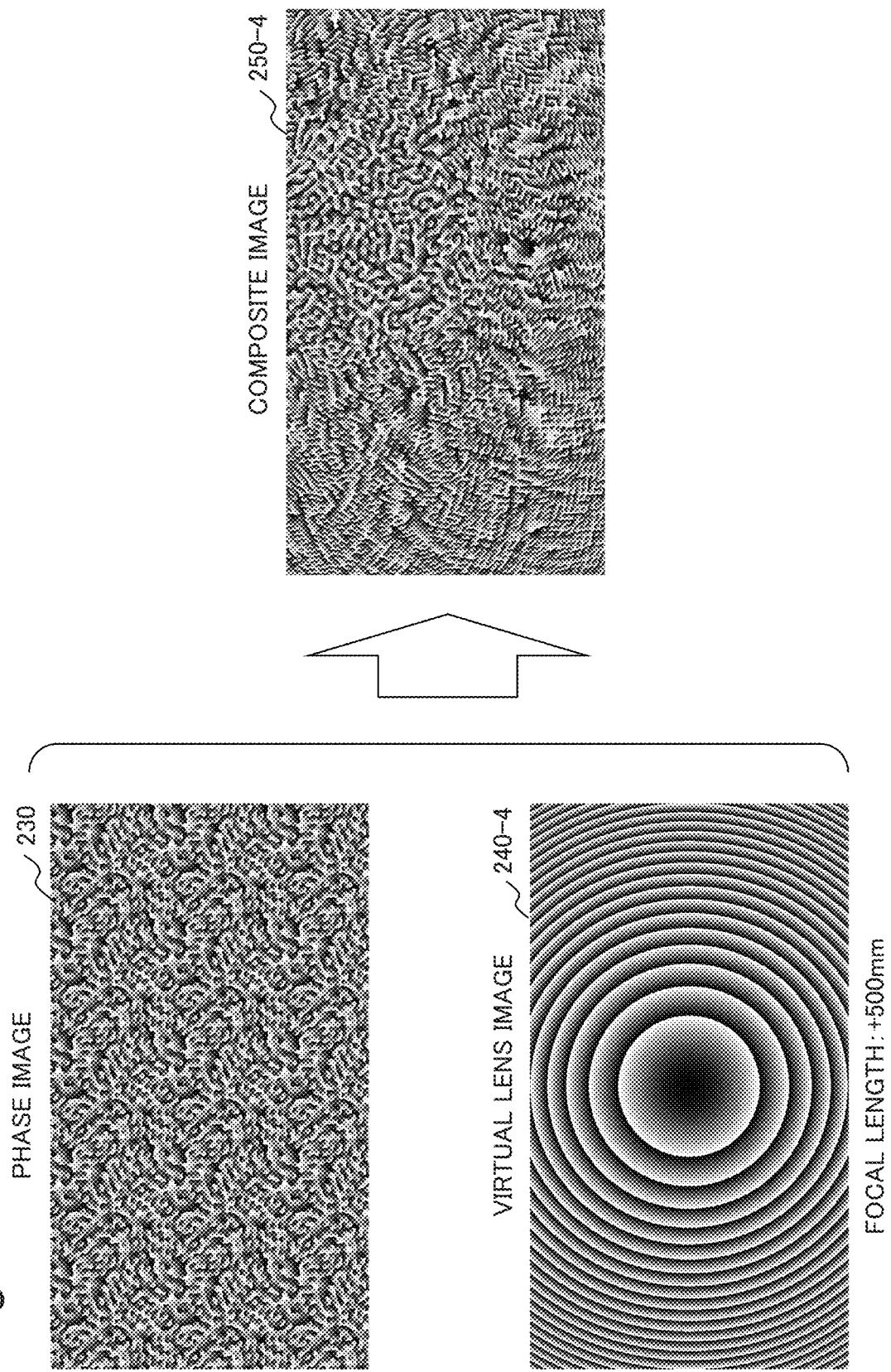
FIG. 9 is a conceptual diagram illustrating one example of a composite image (focal length: +500 mm) to be displayed on the display unit of the spatial light modulator of the projection device according to the first example embodiment of the present invention.

FIG. 6 is an example in which the composite image 250-1 is generated by using the virtual lens image 240-1 having a focal length: +10 mm. FIG. 7 is an example in which the composite image 250-2 is generated by using the virtual lens image 240-2 having a focal length: +50 mm. FIG. 8 is an example in which the composite image 250-3 is generated by using the virtual lens image 240-3 having a focal length: +100 mm. FIG. 9 is an example in which the composite image 250-4 is generated by using the virtual lens image 240-4 having a focal length: +500 mm.

The composite images 250-1 to 250-4 are images acquired by combining the phase image 230 and the virtual lens images 240-1 to 240-4. The virtual lens images 240-1 to 240-4 are arranged as one lens shape on the display unit of the spatial light modulator 30, unlike the phase image 230 in which a phase distribution is arranged in a tile shape on the display unit of the spatial light modulator 30.

The foregoing is description about the virtual lens. The virtual lens is not limited to the patterns described in FIGS. 5 to 9, and may be set appropriately according to a focal length.

As described above, a projection device according to the present example embodiment displays, on a display unit of a spatial light modulator of a phase modulation type, a composite image acquired by combining a phase image of an image to be displayed on a projected surface, and a virtual lens image for collecting light at a desired focal length. The projection device according to the present example embodiment irradiates coherent light to the display unit of the spatial light modulator in a state that the composite image is displayed on the display unit, and projects a reflected light of the coherent light, as projection light, after removing a high-order component included in reflected light of the coherent light by an aperture. Therefore, the present example embodiment is able to omit a Fourier transform lens from a projection device in which a spatial light modulator of a phase modulation type is employed, by using a function of a virtual lens.

The present example embodiment is able to reduce the size of a device, since the number of constituent elements is reduced by omitting a Fourier transform lens. Further, the present example embodiment is able to enhance a degree of freedom on a layout on a light source side, and achieve further miniaturization.

[Related Art]

Figure 10:
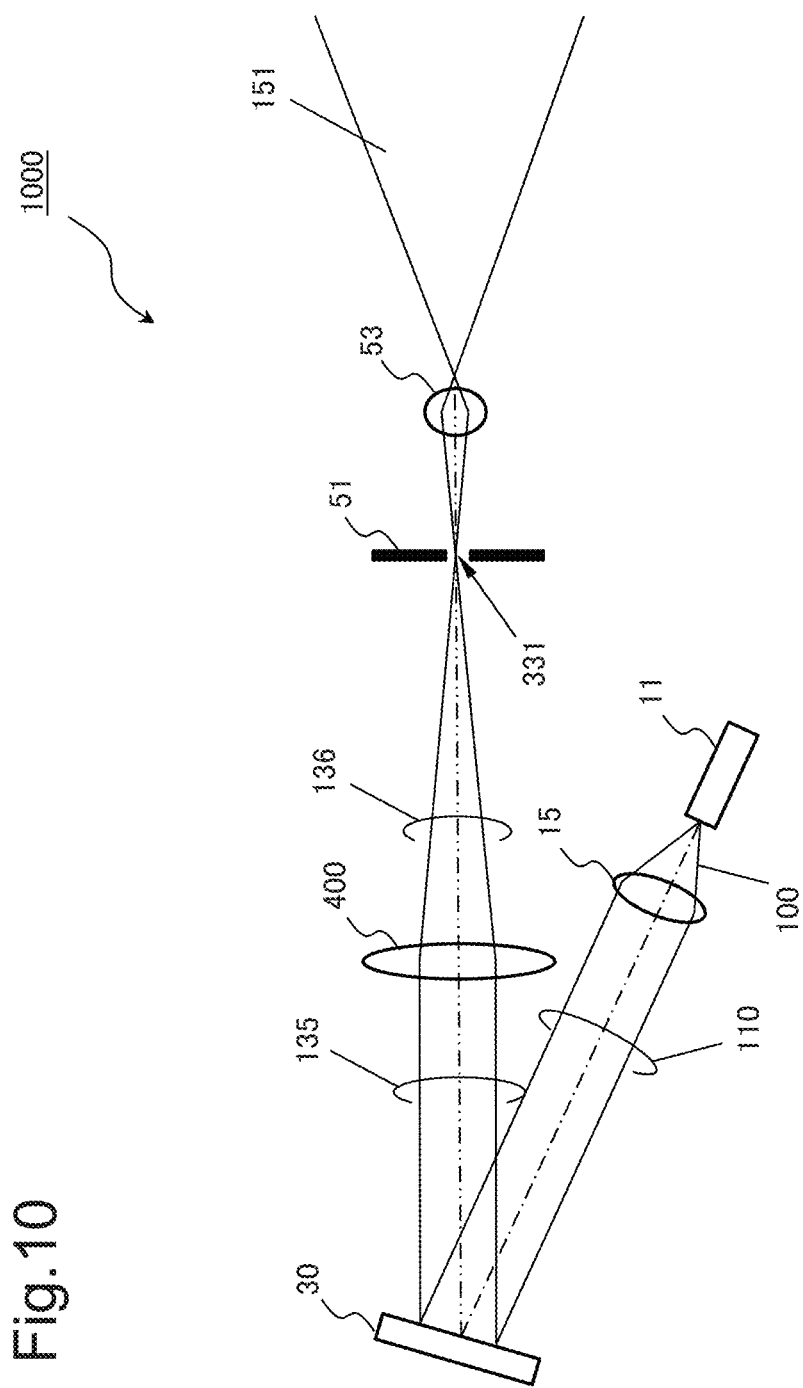
FIG. 10 is a conceptual diagram illustrating a configuration of a projection device according to a related art.

For comparison with a projection device according to the present example embodiment, a projection device according to a related art using a Fourier transform lens is described with reference to the drawings. FIG. 10 is a conceptual diagram illustrating a configuration of a projection device 1000 according to a related art. FIG. 10 is a conceptual diagram, and does not accurately illustrate a positional relation among constituent elements, an irradiation direction of light, and the like. In FIG. 10, a casing of the projection device 1000 is omitted, and only an internal configuration thereof is illustrated. To simplify the description, in FIG. 10, only representative components are illustrated. In FIG. 10, components similar to those in FIG. 2 are indicated with same reference signs, and described.

The projection device 1000 displays, on a display unit of a spatial light modulator 30, a phase distribution of an image to be displayed on a projected surface. When this is described by way of the example of FIG. 3, not the composite image 250, but the phase image 230 is displayed on the display unit of the spatial light modulator 30.

In the configuration of the projection device 1000, since modulated light 135 to be reflected on the display unit of the spatial light modulator 30 is not collected by a function of a virtual lens, it is necessary to dispose a Fourier transform lens 400 between the spatial light modulator 30 and an aperture 51. The Fourier transform lens 400 is an optical lens for forming, at a nearby light collecting position, an image to be formed when the modulated light 135 reflected on the display unit of the spatial light modulator 30 is projected at infinity. In the example of FIG. 10, light 136 transmitted through the Fourier transform lens 400 is collected at an opening position (first light collecting position 331) of the aperture 51. Light in which a high-order component is removed by the aperture 51 is projected as projection light 151 by a projection lens 53.

As illustrated in FIG. 10, in the configuration according to the related art, the Fourier transform lens 400 is an indispensable component. When the Fourier transform lens 400 is disposed inside a casing, as exemplified by a configuration of the projection device 1000, a holding unit for fixing a position of the Fourier transform lens 400 is necessary. Inside the casing of the projection device 1000, a limitation occurs regarding an angle of a collimator optical system by the holding unit of the Fourier transform lens 400.

In the configuration according to the related art, a distance between the spatial light modulator 30 and the Fourier transform lens 400, and a distance between the Fourier transform lens 400 and the aperture 51 correspond to a focal length of the Fourier transform lens 400. Therefore, in the configuration according to the related art, a distance from the spatial light modulator 30 to the aperture 51 is made long by a length corresponding to a focal length of the Fourier transform lens 400.

FIG. 11 is a conceptual diagram for comparting the projection device 1 according to the present example embodiment with the projection device 1000 according to the related art. FIG. 11 is a conceptual diagram and does not accurately illustrate a positional relation among constituent elements, an irradiation direction of light, and the like. As described above, in the projection device 1 according to the present example embodiment, omitting the Fourier transform lens 400 enables to dispose the light source 10 and the projection optical system 50 close to the spatial light modulator 30, as compared with the projection device 1000 according to the related art. In the projection device 1 according to the present example embodiment, since the Fourier transform lens 400 is omitted, it is possible to reduce an angle between the laser light 100 to be irradiated toward the spatial light modulator 30 from the light source 10, and the modulated light 130 to be emitted from the spatial light modulator 30. In the projection device 1 according to the present example embodiment, since the aperture 51 is disposed at a light collecting position of a virtual lens, it is possible to shorten a distance from the spatial light modulator 30 to the aperture 51, as compared with the projection device 1000 according to the related art. Therefore, the projection device 1 according to the present example embodiment can be miniaturized, as compared with the projection device 1000 according to the related art.

In a configuration according to the present example embodiment, a Fourier transform lens is made unnecessary by displaying, on a display unit of a spatial light modulator, a composite image of a phase image of an image to be displayed on a projected surface, and a virtual lens image. Therefore, the configuration according to the present example embodiment is able to provide a projection device in which the number of components is reduced, and miniaturization of a device is achieved.

Second Example Embodiment

Figure 12:
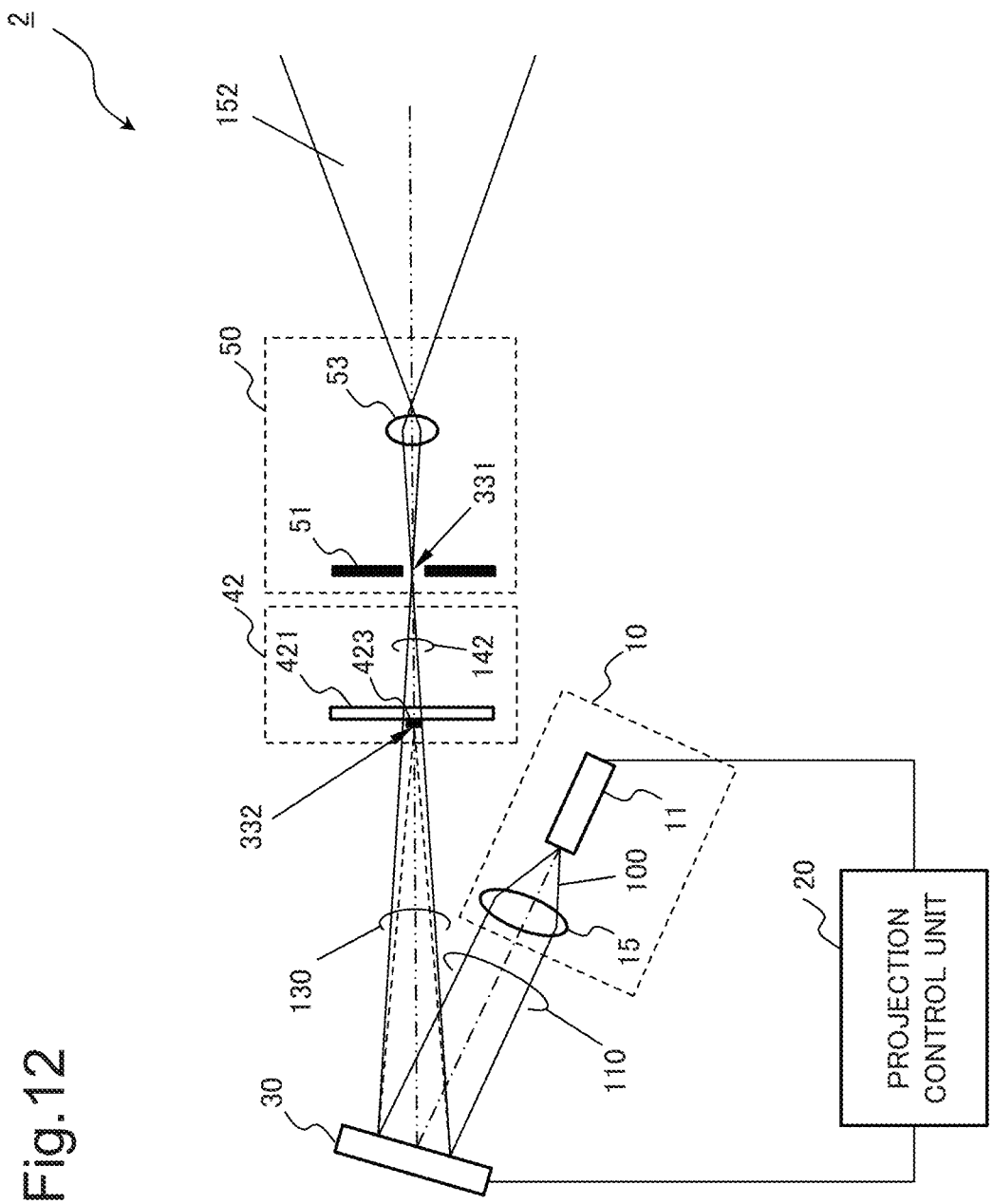
FIG. 12 is a conceptual diagram illustrating a configuration of a projection device according to a second example embodiment of the present invention.

Next, a projection device according to a second example embodiment is described with reference to a drawing. FIG. 12 is a conceptual diagram illustrating a configuration of a projection device 2 according to the present example embodiment. FIG. 12 is a conceptual diagram, and does not accurately illustrate a positional relation among constituent elements, an irradiation direction of light, and the like. The projection device 2 according to the present example embodiment is different from the projection device 1 according to the first example embodiment in a point that the projection device 2 includes a zero-order light removing unit 42. Since a configuration other than the zero-order light removing unit 42 is similar to that of the projection device 1 according to the first example embodiment, detailed description thereof is omitted.

The zero-order light removing unit 42 includes a holding member 421 and a light absorbing member 423.

The holding member 421 is a member for holding the light absorbing member 423.

For example, the holding member 421 is made of a material capable of easily transmitting modulated light 130 such as glass and plastic. When the holding member 421 is made of plastic, it is preferable to use a material whose entire surface is even, and whose phase unevenness is small in such a way that retardation is less likely to occur. For example, a plastic material whose birefringence is suppressed is preferable.

For example, the holding member 421 may include a wire member for fixing the light absorbing member 423. For example, it is possible to form a periphery of the holding member 421 into a frame shape, and wind a wire member on the inner side of an opening portion of the frame to thereby fix the light absorbing member 423 by the wound wire member. When the holding member 421 is constituted of a wire member, a material which is less likely to cause deterioration by light may be used, or a thin wire member may be used to such an extent that the modulated light 130 does not impinge in such a way that deterioration is less likely to occur by irradiation of the modulated light 130.

The light absorbing member 423 is held by the holding member 421, and is disposed in such a way as to locate at a second light collecting position 332. For example, the light absorbing member 423 is constituted of a black body such as carbon. When a wavelength of laser light to be used is fixed, a material capable of preferentially absorbing light of a specific wavelength may be used for the light absorbing member 423.

Also in the present example embodiment, similarly to the first example embodiment, a composite image acquired by combining a phase image of an image to be displayed on a projected surface, and a virtual lens image is displayed on a display unit of a spatial light modulator 30. When the modulated light 130 reaches the zero-order light removing unit 42, zero-order light included in the modulated light 130 is absorbed by the light absorbing member 423 of the zero-order light removing unit 42. On the other hand, light 142 in which zero-order light is removed by the zero-order light removing unit 42 is collected at an opening position (first light collecting position 331) of an aperture 51. The light 142 that has reached the aperture reaches a projection lens 53 after high-order light is removed by a frame portion of the aperture 51, and is projected as projection light 152 by the projection lens 53. Since zero-order light is not included in the projection light 152, an image excluding the zero-order light is displayed on a projected surface.

As described above, in the present example embodiment, since zero-order light is removed by a zero-order light removing unit, an image excluding the zero-order light is displayed on a projected surface. In the first example embodiment, since zero-order light is not removed from projection light, it is necessary to displace a display position of an image, and a position where the zero-order light is supposed to be displayed from each other. In contrast, since the present example embodiment is able to remove zero-order light from projection light, it is possible to display a desired image at a position where the zero-order light is supposed to be displayed. Specifically, the present example embodiment is able to reduce constraints on a display position of an image to be displayed on a projected surface.

Third Example Embodiment

Figure 13:
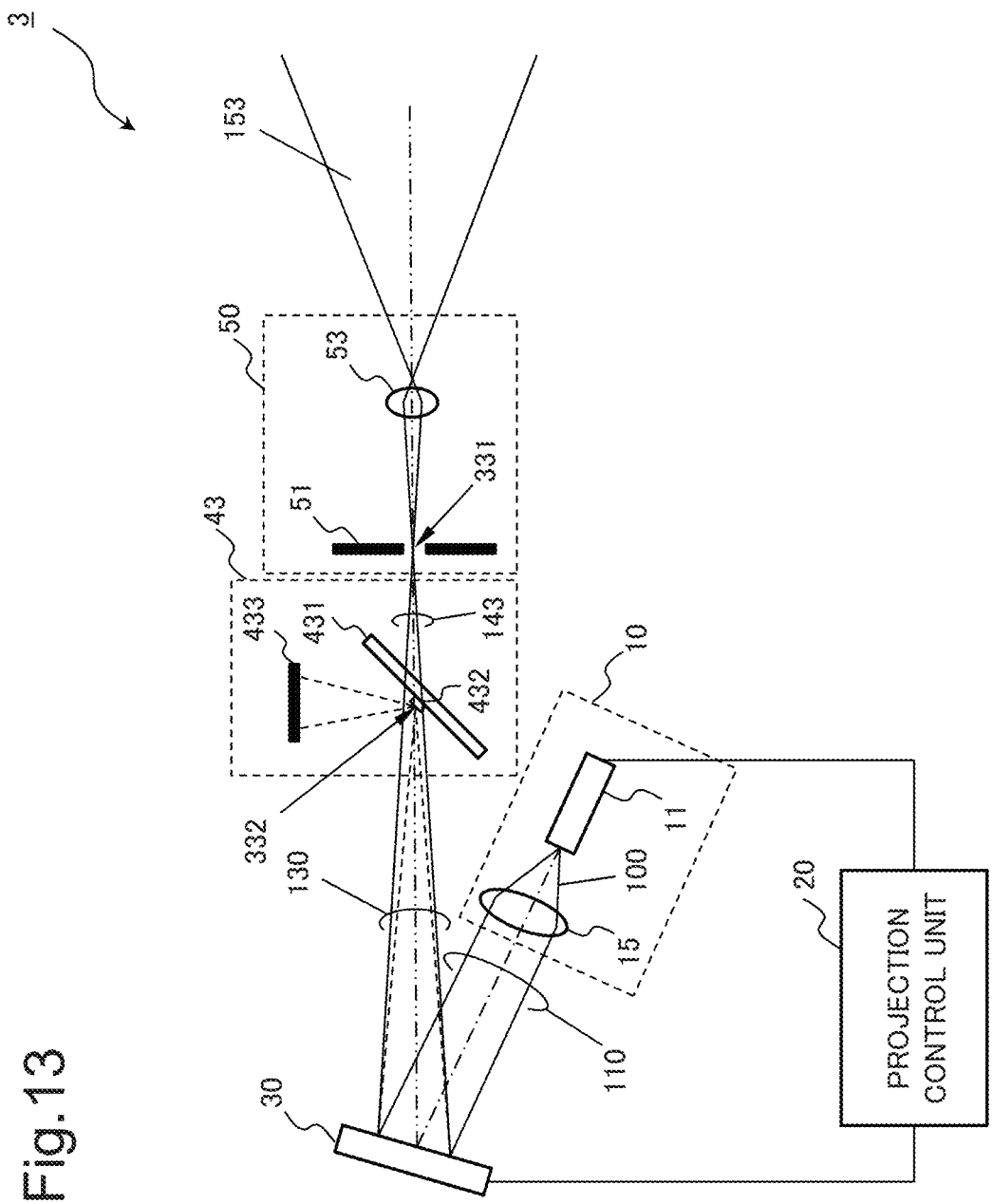
FIG. 13 is a conceptual diagram illustrating a configuration of a projection device according to a third example embodiment of the present invention.

Next, a projection device according to a third example embodiment is described with reference to a drawing. FIG. 13 is a conceptual diagram illustrating a configuration of a projection device 3 according to the present example embodiment. FIG. 13 is a conceptual diagram, and does not accurately illustrate a positional relation among constituent elements, an irradiation direction of light, and the like. The projection device 3 according to the present example embodiment is different from the projection device 1 according to the first example embodiment in a point that the projection device 3 includes a zero-order light removing unit 43. The projection device 3 according to the present example embodiment is different from the projection device 2 according to the second example embodiment in a point that a light absorbing member absorbing zero-order light is not disposed on an optical path of modulated light, but a light absorbing member absorbs zero-order light after reflecting light in a direction deviated from an optical path of modulated light. Since a configuration other than the zero-order light removing unit 43 is similar to that of the projection device 1 according to the first example embodiment, detailed description thereof is omitted.

The zero-order light removing unit 43 includes a holding member 431, a reflection member 432, and a light absorbing member 433.

The holding member 431 is a member for holding the reflection member 432. For example, the holding member 431 is made of a material capable of easily transmitting modulated light 130 such as glass and plastic. For example, the holding member 431 may include a wire member for fixing the reflection member 432. For example, it is possible to form a periphery of the holding member 431 into a frame shape, and wind a wire member on the inner side of an opening portion of the frame to thereby fix the reflection member 432 by the wound wire member. A structure and a material of the holding member 431 may be similar to those of the holding member 421 according to the second example embodiment.

The reflection member 432 is held by the holding member 431, and is disposed in such a way as to locate at a second light collecting position 332. For example, the reflection member 432 is made of a material capable of reflecting light, such as metal including aluminum, silver, and the like, or a dielectric material. The reflection member 432 may be configured by forming a thin film such as a metal thin film of aluminum, silver, and the like, or a dielectric thin film on a surface of the holding member 431. When the reflection member 432 is formed of a thin film, the reflection member 432 may be a mono-layer film or a multi-layer film, as long as the reflection member 432 reflects modulated light.

The light absorbing member 433 is disposed at a propagating position of reflected light by the reflection member 432. The light absorbing member 433 is constituted of a black body such as carbon. When a wavelength of laser light to be used is fixed, a material capable of preferentially absorbing light of a specific wavelength may be used for the light absorbing member 433. For example, the light absorbing member 433 is disposed inside a casing for accommodating the projection device 3. For example, it is preferable to configure in such a way as to release, into the casing, heat generated by absorbing light by the light absorbing member 433.

Also in the present example embodiment, similarly to the first example embodiment, a composite image acquired by combining a phase image of an image to be displayed on a projected surface, and a virtual lens image is displayed on a display unit of a spatial light modulator 30. When the modulated light 130 reaches the zero-order light removing unit 43, zero-order light included in the modulated light 130 is reflected by the reflection member 432, and propagates in a direction deviated from an optical path of the modulated light 130. Light reflected on the reflection member 432 is absorbed by the light absorbing member 433 disposed in a propagating direction of the light. On the other hand, light 143 in which zero-order light is removed by the zero-order light removing unit 43 is collected at an opening position (first light collecting position 331) of an aperture 51. The light 143 that has reached the aperture reaches a projection lens 53 after high-order light is removed by a frame portion of the aperture 51, and is projected as projection light 153 by the projection lens 53. Since zero-order light is not included in the projection light 153, an image excluding the zero-order light is displayed on a projected surface.

As described above, in the present example embodiment, similarly to the second example embodiment, since zero-order light is removed by a zero-order light removing unit, an image excluding the zero-order light is displayed on a projected surface. Similarly to the second example embodiment, in the present example embodiment, since it is possible to remove zero-order light from projection light, it is possible to display a desired image at a position where the zero-order light is supposed to be displayed. Specifically, the present example embodiment is able to reduce constraints on a display position of an image to be displayed on a projected surface.

In the present example embodiment, a light absorbing member absorbs zero-order light after light is deviated from an optical path of modulated light. Disposing a light absorbing member in contact with an interior of a casing makes it easy to release heat to the outside by transfer through the casing. Therefore, a possibility of forming a hole by accumulation of heat in the light absorbing member is reduced.

Fourth Example Embodiment

Figure 14:
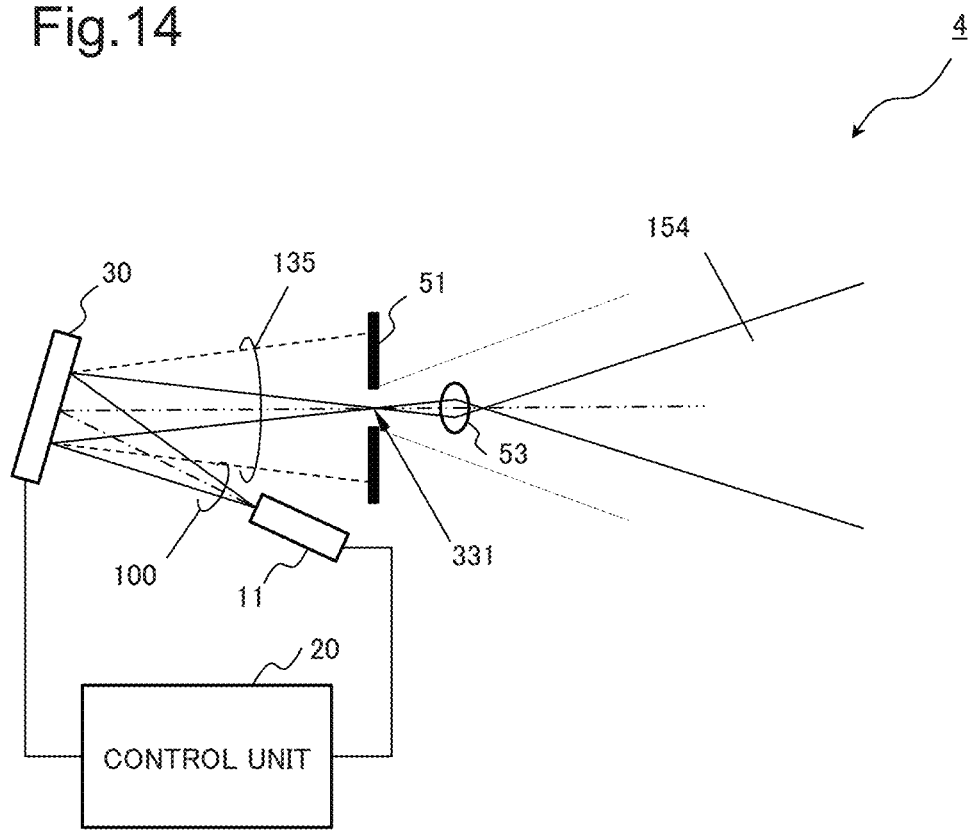
FIG. 14 is a conceptual diagram illustrating a configuration of a projection device according to a fourth example embodiment of the present invention.

Next, a projection device according to a fourth example embodiment is described with reference to the drawings. FIG. 14 is a conceptual diagram illustrating a configuration of a projection device 4 according to the present example embodiment. FIG. 14 is a conceptual diagram, and does not accurately illustrate a positional relation among constituent elements, an irradiation direction of light, and the like. The present example embodiment is different from the first to third example embodiments in a point that a collimator is omitted. The present example embodiment is different from the second and third example embodiments in a point that collected zero-order light is not absorbed by a light absorbing member, but is made less conspicuous by diverging. Since a configuration other than the collimator is similar to that of the projection device 1 according to the first example embodiment, detailed description thereof is omitted.

The projection device 4 does not convert laser light 100 to be emitted from an emitting unit 11 into parallel light by a collimator, but irradiates the laser light 100 to a display unit of a spatial light modulator 30. Therefore, the laser light 100 to be emitted from the emitting unit 11 is not converted into parallel light, but propagates while spreading. Thus, in the present example embodiment, in order to form an irradiation area of the laser light 100 within a plane of the display unit of the spatial light modulator 30, the emitting unit 11 and the spatial light modulator 30 are disposed to be close to each other, as compared with the projection device 1 according to the first example embodiment.

In the present example embodiment, a composite image acquired by combining a phase image of an image to be displayed on a projected surface, and a virtual lens image for diverging zero-order light is displayed on the display unit of the spatial light modulator 30. In the first to third example embodiments, a virtual lens (convex lens) having a focal length in a positive (+) direction is used in order to collect zero-order light. On the other hand, in the present example embodiment, a virtual lens (concave lens) having a focal length in a negative (−) direction is used in order to diverge zero-order light. Specifically, the present example embodiment uses a virtual lens image for collecting the laser light 100 incident on the display unit of the spatial light modulator 30 in a negative direction associated with a position of an aperture 51.

Figure 15:
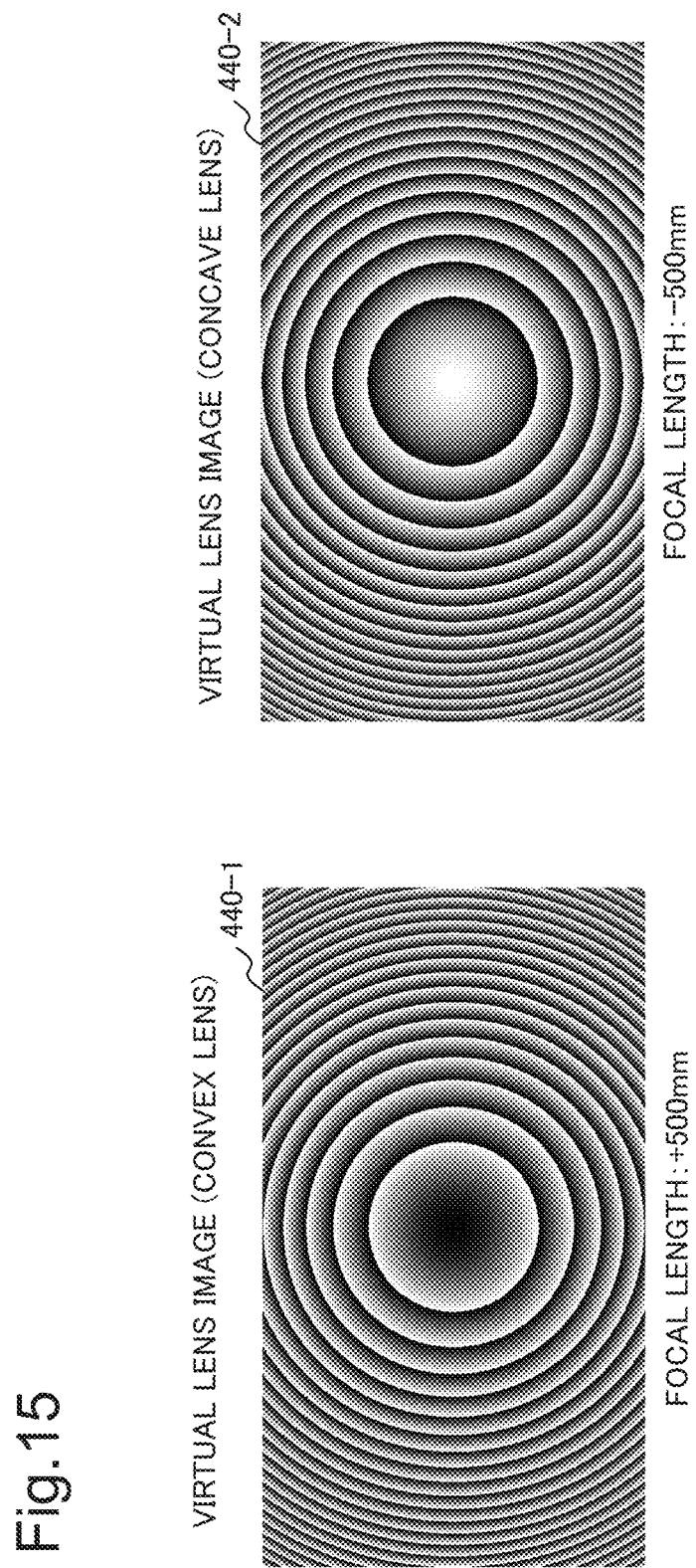
FIG. 15 is a schematic diagram for describing a virtual lens image to be used by the projection device according to the first example embodiment of the present invention.

FIG. 15 illustrates a virtual lens image 440-1 (focal length: +500 mm) exhibiting a function of a convex lens, and a virtual lens image 440-2 (focal length: −500 mm) functioning as a concave lens. The virtual lens image 440-1 functioning as a convex lens has a dark central portion. On the other hand, the virtual lens image 440-2 functioning as a concave lens has a bright central portion. The virtual lens image 440-2 corresponds to an image in which a bright portion and a dark portion of the virtual lens image 440-1 are inverted. In the present example embodiment, as exemplified by the virtual lens image 440-2, a virtual lens image having a focal length in a negative direction is used.

A sufficiently long distance between the emitting unit 11 and the spatial light modulator 30 makes it possible to regard the laser light 100 as parallel light. However, unless a distance between the emitting unit 11 and the spatial light modulator 30 is sufficiently long, an influence by the laser light 100 because of not being parallel light may occur. In view of the above, the present example embodiment uses a composite virtual lens image acquired by combining a virtual lens image for collecting parallel light, and a pattern (phase distribution for wavefront correction) taking into consideration spread of a wavefront.

Figure 16:
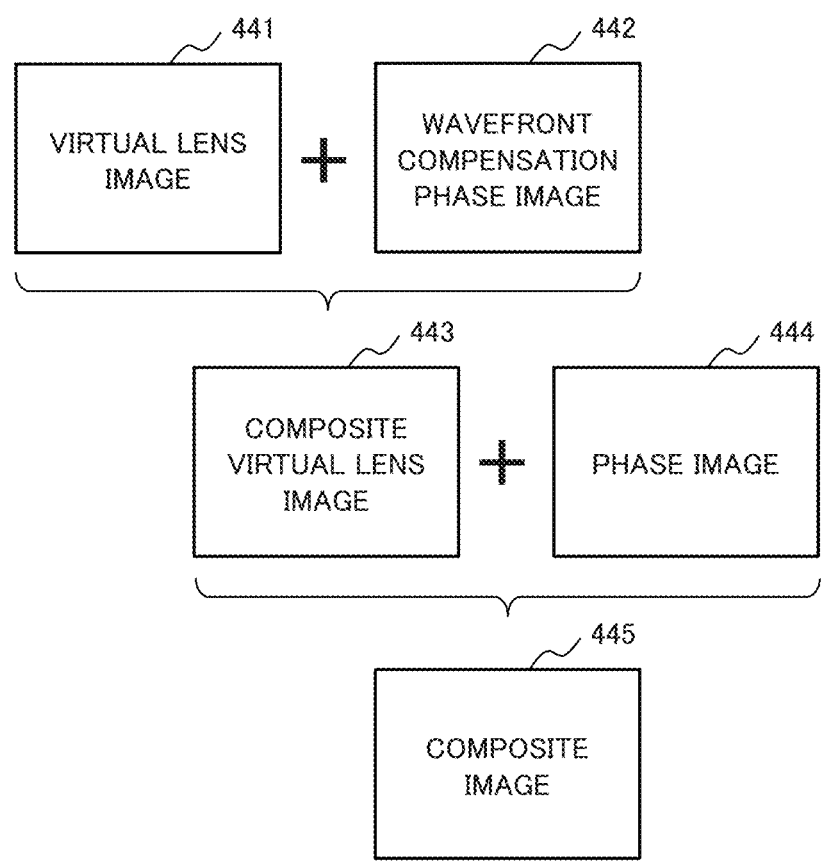
FIG. 16 is a schematic diagram for describing a pattern to be displayed on a display unit of a spatial light modulator of the projection device according to the fourth example embodiment of the present invention.

FIG. 16 is a conceptual diagram for describing a method for combining a composite image 445 to be displayed on the display unit of the spatial light modulator 30 according to the present example embodiment. In the present example embodiment, the composite image 445 acquired by combining a composite virtual lens image 443, which is acquired by combining a virtual lens image 441 and a wavefront compensation phase image 442, and a phase image 444 of an image to be displayed on a projected surface is displayed on the display unit of the spatial light modulator 30.

Similarly to the first to third example embodiments, the virtual lens image 441 is a pattern for collecting parallel light at a position of the aperture 51. The wavefront compensation phase image 442 is a pattern for collecting light whose wavefront spreads spherically at the position of the aperture 51. The wavefront compensation phase image 442 is a wavefront compensation pattern, taking into consideration a position where the laser light 100 impinges on an optical axis, an incoming angle of the laser light 100 with respect to a display surface of the spatial light modulator 30, and the like. The composite virtual lens image 443 acquired by combining the virtual lens image 441 and the wavefront compensation phase image 442 is set in such a way as to collect modulated light 130 on a surface of the aperture 51.

Modulated light 135 reflected on the display unit of the spatial light modulator 30 includes zero-order light that diverges without being collected. Specifically, unlike the first to third example embodiments, in the present example embodiment, zero-order light included in the modulated light 135 spreads, without being collected at a position between the spatial light modulator 30 and the aperture 51.

The modulated light 135 reaches a projection lens 53 after a high-order component is removed by the aperture 51. Zero-order light included in the modulated light 135 is blocked by the aperture 51, except for a component passing through an opening portion of the aperture 51. Among zero-order light included in the modulated light 135, a component passing through an interior of an opening portion of the aperture 51 reaches the projection lens 53, while spreading. Therefore, although projection light 154 to be projected from the projection lens 53 includes the spread zero-order light, a desired image is displayed on a projected surface. The projection light 154 projected by the projection device 4 displays a desired image in a projection area, on the projected surface, which is made bright as a whole by the spread zero-order light.

As described above, the present example embodiment uses a composite virtual lens image acquired by combining a virtual lens image for collecting emission light incident on a display unit of a spatial light modulator in a negative direction associated with a first light collecting position, and a wavefront compensation pattern for compensating a wavefront of the emission light. In the present example embodiment, a desired image is displayed in a projection area, which is made bright by zero order light spread over the entirety of the projection area, by the spread of zero order light. An image to be formed on a projected surface by projection light projected by a projection device according to the present example embodiment is displayed in a projection area, which is made bright as a whole by spread zero-order light, as a background. Therefore, the present example embodiment is inferior to the first to third example embodiments in an aspect of an S/N ratio of a projection image.

In the present example embodiment, since a collimator is omitted, laser light emitted from a light source may be spread. In view of the above, in the present example embodiment, a spatial light modulation element and a light source are disposed to be close to each other in order to form an irradiation area of spread laser light within a plane of a display unit of the spatial light modulator. Therefore, the present example embodiment enables to miniaturize a device, as compared with the first to third example embodiments. In the present example embodiment, since zero-order light is spread, a zero-order light blocking unit is also not necessary. Specifically, in the present example embodiment, since a collimator is omitted, the entirety of an optical system can be further miniaturized by disposing a light source in such a way that an angle defined by an optical axis of laser light and an optical axis of modulated light is made small.

Fifth Example Embodiment

Figure 17:
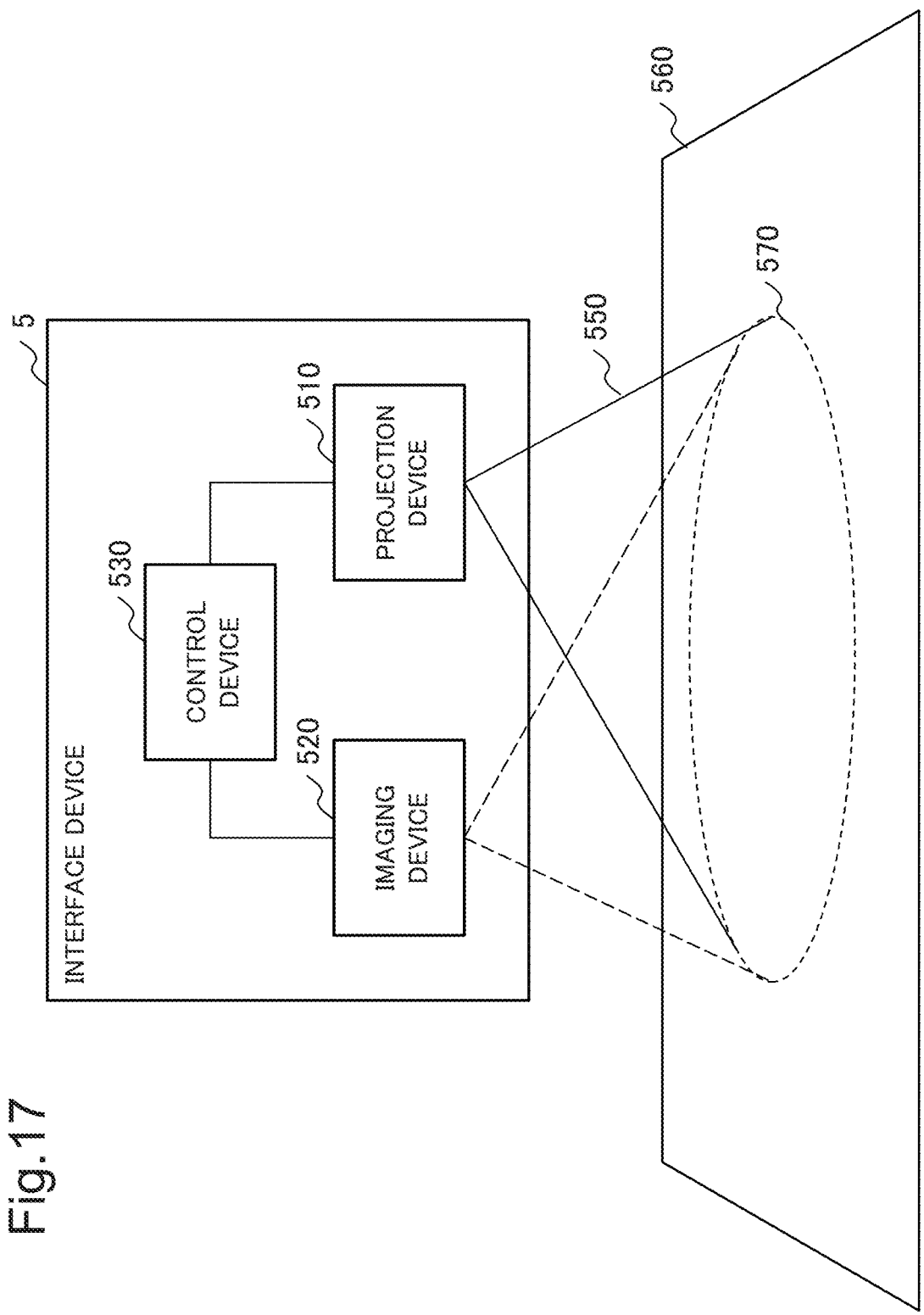
FIG. 17 is a block diagram illustrating a configuration of an interface device according to a fifth example embodiment of the present invention.

Next, an interface device according to a fifth example embodiment of the present invention is described with reference to a drawing. FIG. 17 is a block diagram illustrating a configuration of an interface device 5 according to the present example embodiment. As illustrated in FIG. 17, the interface device 5 includes a projection device 510, an imaging device 520, and a control device 530.

The projection device 510 has a configuration in which a function of a projection control unit is eliminated from a projection device according to the first to fourth example embodiments of the present invention. The function of the projection control unit is included in the control device 530. The projection device 510 is connected to the control device 530, and is operated in response to control of the control device 530 to display a desired image within a projection area 570 of a projected surface 560. For example, the projection device 510 displays, within the projection area 570 of the projected surface 560, a user interface in such a way as to prompt a user to perform an operation.

The imaging device 520 is a camera for capturing the projected surface 560. The imaging device 520 is connected to the control device 530. The imaging device 520 is operated in response to control of the control device 530, and captures an area including the projection area 570 of the projected surface 560. For example, the projection device 510 captures an image including a user interface displayed within the projection area 570 of the projected surface 560, and a pointing member within the projection area 570. The pointing member is a member with which an operation is imparted to a user interface, such as a finger of a user or a pointing stick.

The control device 530 is a control system for outputting a projection instruction to the projection device 510, and outputting an imaging instruction to the imaging device 520. The control device 530 is connected to the projection device 510 and the imaging device 520. The control device 530 recognizes an operation content with respect to a display image by associating a positional relation between a display image displayed on a projected surface by projection light from the projection device 510, and a part of the user's body or a tool (also referred to as a pointing member) with respect to the display image. The control device 530 controls the projection device 510 in such a way as to display, on the projected surface, a response image associated with the recognized operation content. For example, the control device 530 specifies a position of a pointing member by using an image captured by the imaging device 520, and recognizes an operation content of the pointing member, based on a positional relation between a user interface and the pointing member. The control device 530 may control the projection device 510 to project a response image according to a recognized operation content.

[Projection Device]

Figure 18:
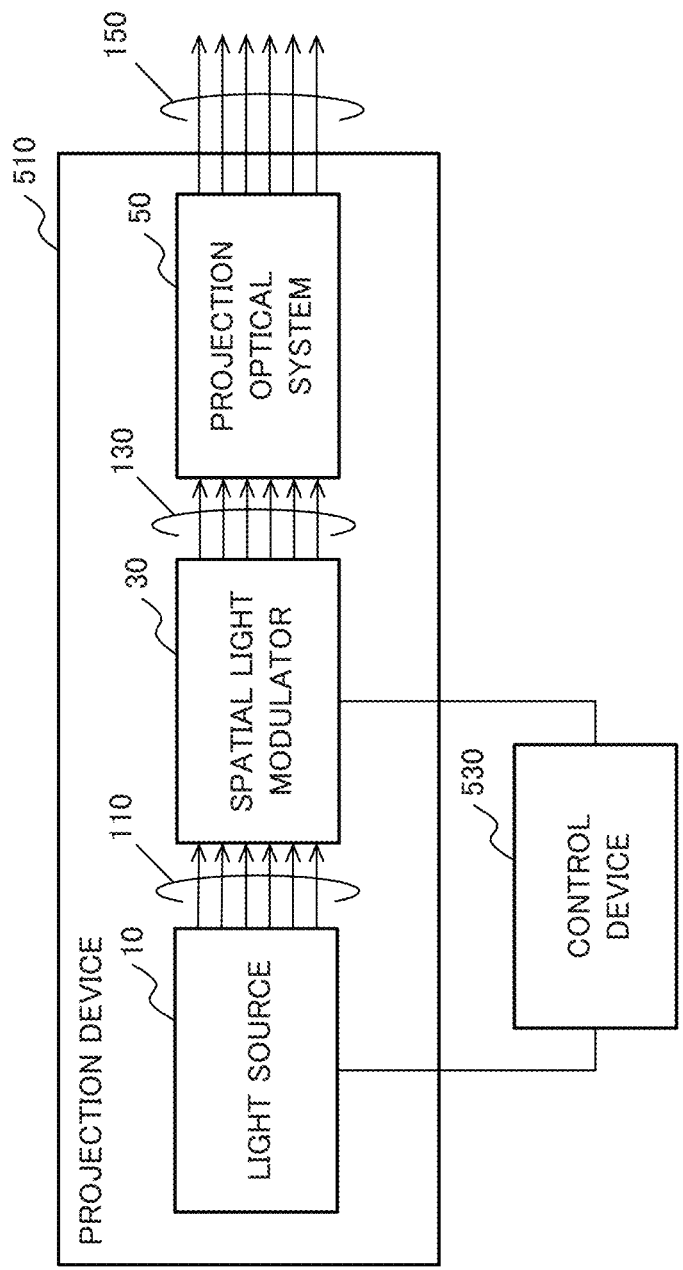
FIG. 18 is a block diagram illustrating a configuration of a projection device included in the interface device according to the fifth example embodiment of the present invention.

Next, the projection device 510 of the interface device 5 is described with reference to a drawing. FIG. 18 is a block diagram illustrating a configuration of the projection device 510. The projection device 510 includes a light source 10, a spatial light modulator 30, and a projection optical system 50. A configuration of the light source 10, the spatial light modulator 30, and the projection optical system 50 is similar to a configuration included in the projection device 1 according to the first example embodiment. The light source 10 and the spatial light modulator 30 are connected to the control device 530.

The light source 10 emits parallel light 110 in response to control of the control device 530. The parallel light 110 emitted from the light source 10 is irradiated within a plane of a display unit of the spatial light modulator 30 where a pattern in response to control of the control device 530 is displayed. A composite image acquired by combining a phase image of an image to be displayed on a projected surface, and a virtual lens image is displayed on the display unit of the spatial light modulator 30 by control of the control device 530. Modulated light 130 reflected by the display unit of the spatial light modulator 30 propagates toward the projection optical system 50. The projection optical system enlarges and projects light in which a high-order component included in the modulated light 130 is removed, as projection light 150.

[Imaging Device]

Figure 19:
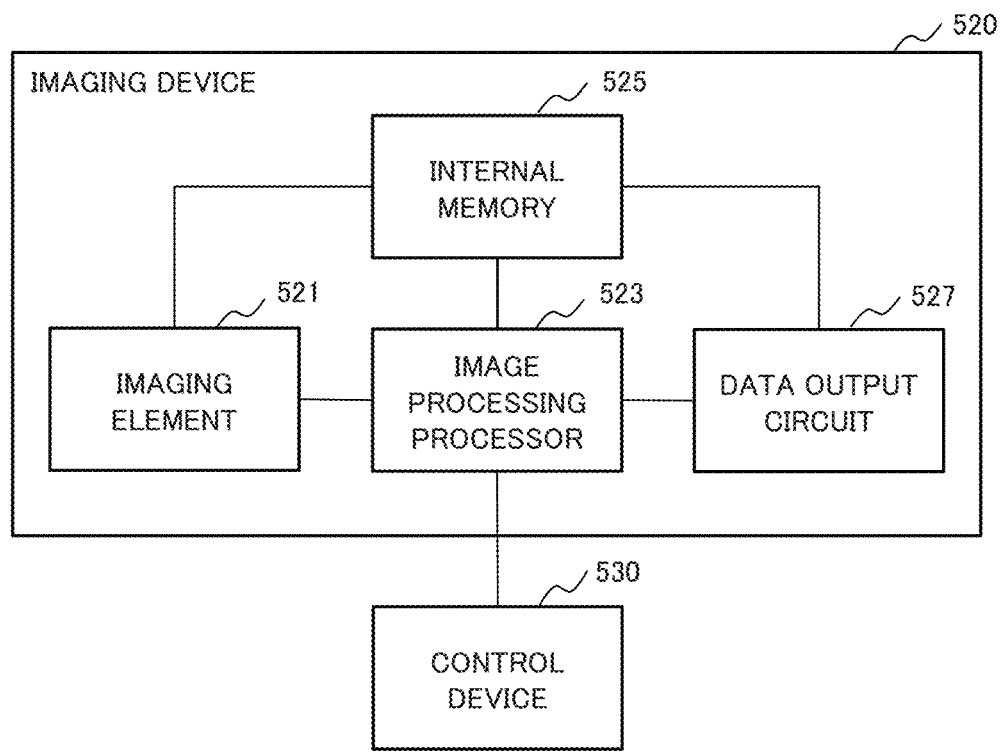
FIG. 19 is a block diagram illustrating a configuration of an imaging device included in the interface device according to the fifth example embodiment of the present invention.

Next, the imaging device 520 of the interface device 5 is described with reference to a drawing. FIG. 19 is a block diagram illustrating a configuration of the imaging device 520. The imaging device 520 includes an imaging element 521, an image processing processor 523, an internal memory 525, and a data output circuit 527. For example, the imaging device includes an imaging function of a general digital camera.

The imaging element 521 is an element for capturing an imaging area including a projection area of the projection device 510, and acquiring imaging data of the imaging area.

The imaging element 521 is a photoelectric conversion element including a semiconductor integrated circuit. The imaging element 521 can be achieved by, for example, a solid-state imaging element such as a charge-coupled device (CCD) and a complementary metal-oxide-semiconductor (CMOS). Generally, the imaging element 521 is constituted of an element for capturing light in a visible range, but may be constituted of an element capable of capturing/detecting an electromagnetic wave, such as an infrared ray, an ultraviolet ray, an X-ray, a gamma ray, a radio wave, and a microwave.

The image processing processor 523 is an integrated circuit for generating image data which has undergone image processing such as dark current correction, interpolation calculation, color space conversion, gamma correction, aberration correction, noise reduction, and image compression with respect to imaging data captured by the imaging element 521.

The internal memory 525 is a storage element for temporarily holding image information that cannot be processed in performing image processing by the image processing processor 523, and processed image information. Image information captured by the imaging element 521 may be temporarily stored in the internal memory 525. The internal memory 525 may be constituted of a general memory.

The data output circuit 527 outputs, to the control device 530, image data processed by the image processing processor 523.

[Control Device]

Figure 20:
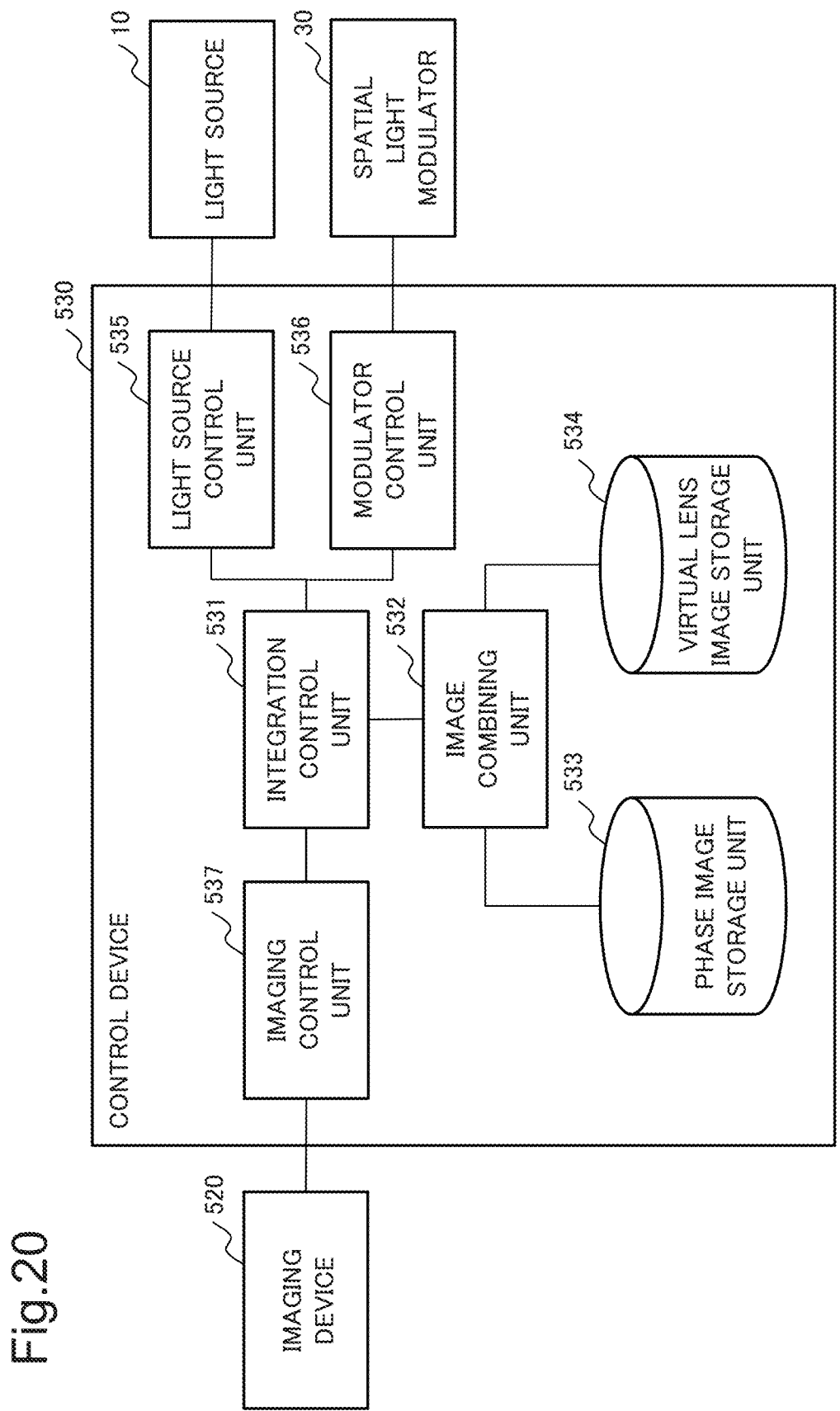
FIG. 20 is a block diagram illustrating a configuration of a control device included in the interface device according to the fifth example embodiment of the present invention.

Next, the control device 530 of the interface device 5 is described with reference to a drawing. FIG. 20 is a block diagram illustrating a configuration of the control device 530. The control device 530 includes an integration control unit 531, an image combining unit 532, a phase image storage unit 533, a virtual lens image storage unit 534, a light source control unit 535, a modulator control unit 536, and an imaging control unit 537. Since each of the image combining unit 532, the phase image storage unit 533, the virtual lens image storage unit 534, the light source control unit 535, and the modulator control unit 536 is similar to a constituent element of a same name in the projection control unit 20 according to the first example embodiment, detailed description thereof is omitted.

The integration control unit 531 generates, by controlling the image combining unit 532, a composite image acquired by combining a phase image of an image to be displayed on the projected surface 560, and a virtual lens image. The integration control unit 531 outputs, to the light source control unit 535 and the modulator control unit 536, a control condition for displaying, on the projected surface 560, the composite image generated by the image combining unit 532.

The integration control unit 531 outputs, to the imaging control unit 537, a control condition for capturing an area including the projection area 570 of the projected surface 560. The integration control unit 531 specifies a position of a pointing member by comparing image data acquired by capturing an area including the projection area 570 of the projected surface 560, with image data displayed within the projection area 570.

For example, the integration control unit 531 displays, within the projection area 570, a user interface as a display image. For example, the integration control unit 531 holds a table in which a position in a user interface, an operation content associated with the position, and a phase distribution of a display image associated with the operation content are associated with one another. The integration control unit 531 identifies the operation content associated with the position of the pointing member by referring to the table. When the operation content is identified, the integration control unit 531 switches a pattern to be displayed on the display unit of the spatial light modulator 30 in association with the operation content.

The imaging control unit 537 causes the imaging device 520 to capture an area including the projection area 570 of the projected surface 560 in response to control of the integration control unit 531, and acquires image data captured by the imaging device 520. The imaging device 520 outputs the acquired image data to the integration control unit 531.

As described above, a user interface according to the present example embodiment is able to analyze, by way of image data captured by an imaging device, an instruction content of a pointing member with respect to a user interface projected from a projection device. A user interface according to the present example embodiment achieves an interactive operation by displaying, on a projected surface, an image according to an analysis result of an instruction content.

(Hardware)

Figure 21:
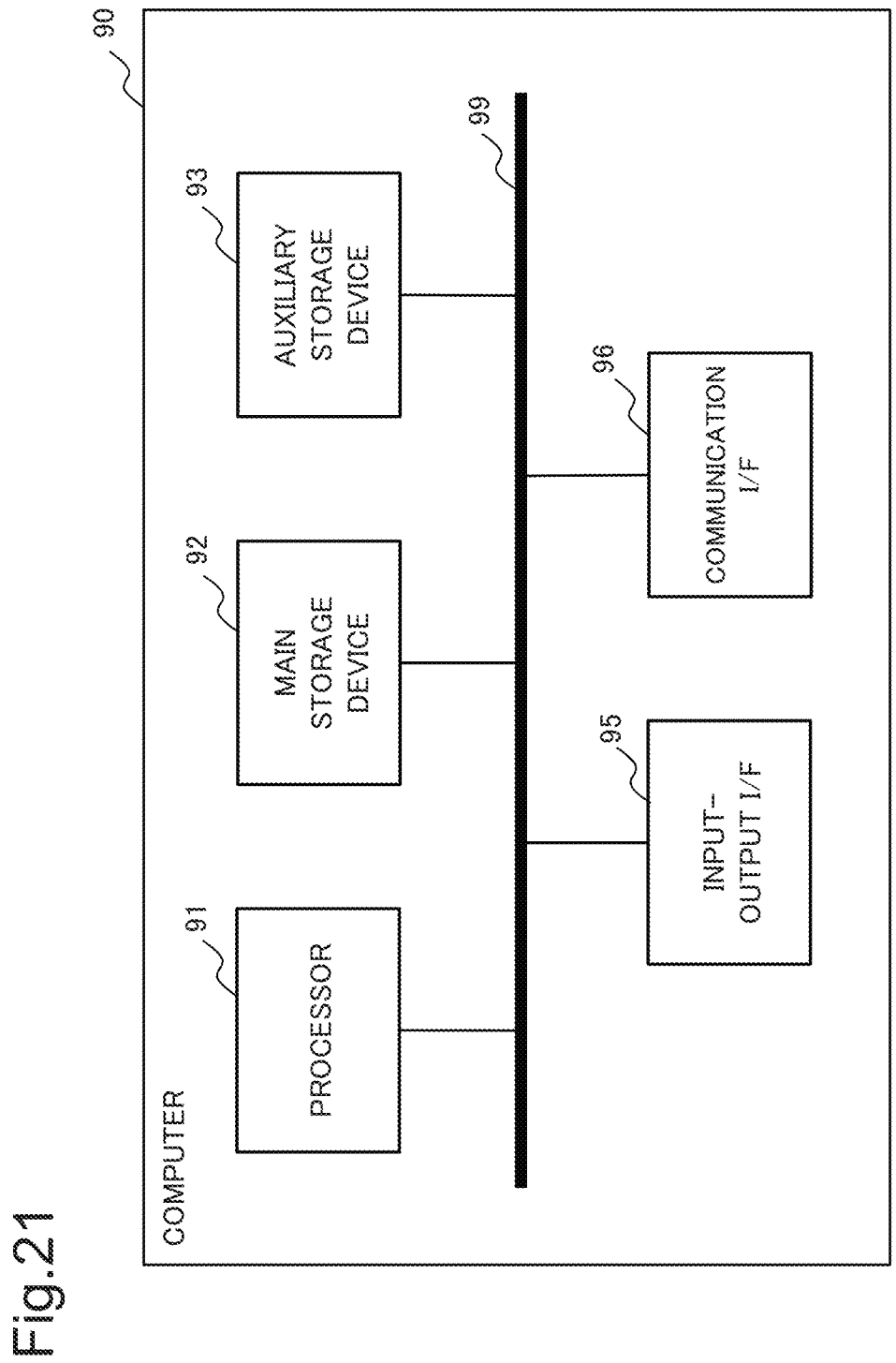
FIG. 21 is a block diagram illustrating a hardware configuration example for achieving a control system of a projection device according to each of the example embodiments of the present invention.

A hardware configuration for achieving a control system of a projection device and an interface device according to each of the example embodiments is described by a computer 90 in FIG. 21 as one example. The computer 90 in FIG. 21 is a configuration example for achieving a control system of each of the example embodiments, and does not limit the scope of the present invention.

As illustrated in FIG. 21, the computer 90 includes a processor 91, a main storage device 92, an auxiliary storage device 93, an input-output interface 95, and a communication interface 96. In FIG. 21, an interface is abbreviated and described as an I/F. The processor 91, the main storage device 92, the auxiliary storage device 93, the input-output interface 95, and the communication interface 96 are connected one another via a bus 99 to enable data communication. The processor 91, the main storage device 92, the auxiliary storage device 93, and the input-output interface 95 are connected to a network such as the Internet and an intranet via the communication interface 96.

The processor 91 expands a program stored in the auxiliary storage device 93 or the like within the main storage device 92, and executes the expanded program. The present example embodiment may be configured to use a software program installed in the computer 90. The processor 91 performs control processing according to the present example embodiment.

The main storage device 92 has an area where a program is expanded. The main storage device 92 may be a volatile memory such as a dynamic random access memory (DRAM), for example. A non-volatile memory such as a magnetoresistive random access memory (MRAM) may be configured/added as the main storage device 92.

The auxiliary storage device 93 stores various pieces of data. The auxiliary storage device 93 is constituted of a local disk such as a hard disk and a flash memory. It is possible to omit the auxiliary storage device 93 by storing various pieces of data in the main storage device 92.

The input-output interface 95 is an interface for connecting the computer 90 and peripheral equipment. The communication interface 96 is an interface for connection to an external system and a device via a network such as the Internet and an intranet, based on a standard or a specification. The input-output interface 95 and the communication interface 96 may be standardized as an interface to be connected to external equipment.

The computer 90 may be connected to input equipment such as a keyboard, a mouse, and a touch panel, as necessary. These pieces of input equipment are used for input of information and settings. When a touch panel is used as input equipment, a display screen of display equipment may also serve as an interface of the input equipment. Data communication between the processor 91 and input equipment may be mediated via the input-output interface 95.

The computer 90 may include display equipment for displaying information. When display equipment is included, the computer 90 may preferably include a display control device (not illustrated) for controlling display of the display equipment. The display equipment may be connected to the computer 90 via the input-output interface 95.

The computer 90 may include a disk drive, as necessary. A disk drive is connected to the bus 99. A disk drive mediates reading of data/program from a recording medium, writing of a processing result of the computer 90 in a recording medium, and the like between the processor 91 and an unillustrated recording medium (program recording medium). The recording medium may be achieved by, for example, an optical recording medium such as a compact disc (CD) and a digital versatile disc (DVD). The recording medium may be achieved by a semiconductor recording medium such as a universal serial bus (USB) memory and a secure digital (SD) card, a magnetic recording medium such as a flexible disk, or another recording medium.

The foregoing is one example of a hardware configuration for achieving a control system of each of the example embodiments according to the present invention. The hardware configuration in FIG. 21 is one example of a hardware configuration for performing control processing according to each of the example embodiments, and does not limit the scope of the present invention. A program that causes a computer to execute the control processing according to each of the example embodiments is also included in the scope of the present invention. A program recording medium recording the program according to each of the example embodiments is also included in the scope of the present invention.

Constituent elements of the control system according to each of the example embodiments can be optionally combined. Constituent elements of the control system according to each of the example embodiments may be achieved by a software or may be achieved by a circuitry.

While the invention has been particularly shown and described with reference to example embodiments thereof, the invention is not limited to these embodiments. It will be understood by those of ordinary skill in the art that various changes in form and details may be made therein without departing from the spirt and scope of the present invention as defined by the claims.

[Supplementary Notes]

The whole or part of the example embodiments disclosed above can be described as, but not limited to, the following supplementary notes.

(Supplementary Note 1)

A projection device including:

a spatial light modulator including a display unit for displaying a pattern associated with a display image;

a light source disposed in such a way as to irradiate emission light to the display unit of the spatial light modulator;

a projection optical system disposed on an optical path of reflected light of the emission light incident on the display unit of the spatial light modulator, and configured to project projection light in which a high-order component included in the reflected light is removed; and a projection control means for controlling the light source in such a way as to display, on the display unit of the spatial light modulator, a composite image acquired by combining a virtual lens image for collecting the emission light incident on the display unit of the spatial light modulator at a first light collecting position, and the pattern associated with the display image, and irradiate the emission light to the display unit of the spatial light modulator.

(Supplementary Note 2)

The projection device according to supplementary note 1, wherein the spatial light modulator includes a modulation element of a phase modulation type.

(Supplementary Note 3)

The projection device according to supplementary note 1 or 2, wherein the projection optical system includes an aperture for removing a high-order component of the reflected light, and a projection lens for enlarging and projecting the reflected light in which a high-order component is removed by the aperture, and the aperture is disposed at the first light collecting position.

(Supplementary Note 4)

The projection device according to any one of supplementary notes 1 to 3, wherein the light source includes an emitting unit for emitting light of a specific wavelength, as the emission light; and a collimator for collimating a wavefront of the emission light to be emitted from the emitting unit, and converting the emission light into parallel light.

(Supplementary Note 5)

The projection device according to supplementary note 4, further including a zero-order light removing means disposed at a second light collecting position where zero-order light included in the reflected light is collected, and configured to remove the zero-order light.

(Supplementary Note 6)

The projection device according to supplementary note 5, wherein the zero-order light removing means includes a light absorbing member, disposed on an optical path of the zero-order light, for absorbing the zero-order light, and a holding member for holding the light absorbing member in such a way as to locate on an optical path of the zero-order light.

(Supplementary Note 7)

The projection device according to supplementary note 5, wherein the zero-order light removing means includes a reflection member, disposed on an optical path of the zero-order light, for reflecting the zero-order light, a holding member for holding the reflection member in such a way as to locate on an optical path of the zero-order light, and a light absorbing member disposed on an optical path of the zero-order light included in light reflected by the reflection member, and configured to absorb the zero-order light.

(Supplementary Note 8)

The projection device according to any one of supplementary notes 1 to 3, wherein the light source is disposed at a position where the emission light emitted from the light source lies within a plane of the display unit of the spatial light modulator, and the projection control means displays, on the display unit of the spatial light modulator, a composite image acquired by combining a composite virtual lens image, and the pattern associated with the display image, the composite virtual lens image being acquired by combining the virtual lens image for collecting the emission light incident on the display unit of the spatial light modulator in a negative direction associated with a first light collecting position, and a wavefront compensation pattern for compensating a wavefront of the emission light.

(Supplementary Note 9)

The projection device according to any one of supplementary notes 2 to 8, wherein the projection control means includes a projection condition setting unit for setting a projection condition of the projection light, a phase image storage unit for storing a phase distribution associated with the display image, a virtual lens image storage unit for storing the virtual lens image, an image combining unit for generating, based on the projection condition, the composite image by combining the phase distribution stored in the phase image storage unit, and the virtual lens image stored in the virtual lens image storage unit, a modulation element control unit for displaying, based on the projection condition, the composite image on the display unit of the spatial light modulator, and a light source control unit for driving and controlling the light source, based on the projection condition, in such a way as to irradiate the emission light to the display unit of the spatial light modulator in a state that the composite image is displayed.

(Supplementary Note 10)

The projection device according to supplementary note 9, wherein the virtual lens image storage unit stores a pattern of a concentric circular shape, as the virtual lens image.

(Supplementary Note 11)

The projection device according to supplementary note 10, wherein the virtual lens image storage unit stores the virtual lens image having a positive focal length, and functioning as a convex lens.

(Supplementary Note 12)

The projection device according to supplementary note 10, wherein the virtual lens image storage unit stores the virtual lens image having a negative focal length, and functioning as a concave lens.

(Supplementary Note 13)

The projection device according to any one of supplementary notes 10 to 12, wherein the virtual lens image storage unit stores a plurality of the virtual lens images according to a focal length.

(Supplementary Note 14)

An interface device including:

a projection means provided with a spatial light modulator including a display unit for displaying a pattern associated with a display image, a light source disposed in such a way as to irradiate emission light to the display unit of the spatial light modulator, and a projection optical system disposed on an optical path of reflected light of the emission light incident on the spatial light modulator, and configured to project projection light in which a high-order component included in the reflected light is removed;

an imaging means for capturing a display area of the display image, and generating image data of the display area; and a control means for controlling the light source in such a way as to display, on the display unit of the spatial light modulator, a composite image acquired by combining a virtual lens image for collecting the emission light incident on the display unit of the spatial light modulator at a first light collecting position, and the pattern associated with the display image, and irradiate the emission light to the display unit of the spatial light modulator, controlling the imaging means to capture a display area of the display image, and analyzing image data of the display area captured by the imaging means.

(Supplementary Note 15)

The interface device according to supplementary note 14, wherein the control means analyzes the image data acquired by capturing the display area, and recognizes, based on an operation content associated with a position in the display area, and a position of a pointing member included in the image data, the operation content with respect to the display image.

(Supplementary Note 16)

A projection method in a projection device provided with a spatial light modulator including a display unit for displaying a pattern associated with a display image, a light source disposed in such a way as to allow incidence of emission light on the display unit of the spatial light modulator, and a projection optical system disposed on an optical path of reflected light of the emission light incident on the spatial light modulator, and configured to project as projection light by removing a high-order component included in the reflected light, the projection method including:

generating a composite image acquired by combining a virtual lens image for collecting the emission light incident on the display unit of the spatial light modulator at a first light collecting position, and the pattern associated with the display image;

displaying the generated composite image on the display unit of the spatial light modulator; and controlling the light source in such a way as to irradiate the emission light to the display unit of the spatial light modulator.

REFERENCE SIGNS LIST 1, 2, 3, 4 Projection device
5 Interface device
10 Light source
11 Emitting unit
15 Collimator
20 Projection control unit
21 Projection condition setting unit
22 Image combining unit
23 Phase image storage unit
24 Virtual lens image storage unit
25 Light source control unit
26 Modulator control unit
30 Spatial light modulator
42, 43 Zero-order light removing unit
50 Projection optical system
51 Aperture
53 Projection lens
400 Fourier transform lens
421 Holding member
423 Light absorbing member 431 Holding member
432 Reflection member
433 Light absorbing member
510 Projection device
520 Imaging device
521 Imaging element
523 Image processing processor
525 Internal memory
527 Data output circuit
530 Control device
531 Integration control unit
532 Image combining unit
533 Phase image storage unit
534 Virtual lens image storage unit
535 Light source control unit
536 Modulator control unit
537 Imaging control unit

The invention claimed is:

1. A projection device comprising:
a spatial light modulator including a display unit configured to display a pattern associated with a display image;
a light source disposed in such a way as to irradiate emission light to the display unit of the spatial light modulator;
a projection optical system disposed on an optical path of reflected light of the emission light incident on the display unit of the spatial light modulator, and configured to project projection light in which a high-order component included in the reflected light is removed; and
a projection controller configured to control the light source in such a way as to display, on the display unit of the spatial light modulator, a composite image acquired by combining a composite virtual lens image and the pattern associated with the display image, the composite virtual lens image being acquired by combining a virtual lens image for collecting the emission light incident on the display unit of the spatial light modulator in a negative direction associated with a first light collecting position and a wavefront compensation pattern for compensating a wavefront of the emission light, and irradiate the emission light to the display unit of the spatial light modulator,
wherein
the light source is disposed at a position where the emission light emitted from the light source lies within a plane of the display unit of the spatial light modulator; and
the virtual lens image functions as a concave lens.

2. The projection device according to claim 1, wherein the spatial light modulator includes a modulation element of a phase modulation type.

3. The projection device according to claim 1, wherein the projection optical system includes
an aperture configured to remove a high-order component of the reflected light, and
a projection lens configured to enlarge and project the reflected light in which a high-order component is removed by the aperture, and
the aperture is disposed at the first light collecting position.

4. The projection device according to claim 1, wherein the light source includes
an emitting unit configured to emit light of a specific wavelength, as the emission light; and a collimator configured to collimate a wavefront of the emission light to be emitted from the emitting unit, and convert the emission light into parallel light.

5. The projection device according to claim 4, further comprising a zero-order light remover disposed at a second light collecting position where zero-order light included in the reflected light is collected, and configured to remove the zero-order light.

6. The projection device according to claim 5, wherein the zero-order light remover
includes
a light absorbing member, disposed on an optical path of the zero-order light, configured to absorb the zero-order light, and
a holding member configured to hold the light absorbing member in such a way as to locate on an optical path of the zero-order light.

7. The projection device according to claim 5, wherein the zero-order light remover
includes
a reflection member, disposed on an optical path of the zero-order light, configured to reflect the zero-order light,
a holding member configured to hold the reflection member in such a way as to locate on an optical path of the zero-order light, and
a light absorbing member disposed on an optical path of the zero-order light included in light reflected by the reflection member, and configured to absorb the zero-order light.

8. The projection device according to claim 2, wherein the projection controller includes
a projection condition setting unit configured to set a projection condition of the projection light,
a phase image storage unit configured to set a phase distribution associated with the display image,
a virtual lens image storage unit configured to store the virtual lens image,
an image combining unit configured to generate, based on the projection condition, the composite image by combining the phase distribution stored in the phase image storage unit, and the virtual lens image stored in the virtual lens image storage unit,
a modulation element control unit configured to display, based on the projection condition, the composite image on the display unit of the spatial light modulator, and
a light source controller configured to drive and control the light source, based on the projection condition, in such a way as to irradiate the emission light to the display unit of the spatial light modulator in a state that the composite image is displayed.

9. The projection device according to claim 8, wherein the virtual lens image storage unit stores a pattern of a concentric circular shape, as the virtual lens image.

10. The projection device according to claim 9, wherein the virtual lens image storage unit stores the virtual lens image having a positive focal length, and functioning as a convex lens.

11. The projection device according to claim 9, wherein the virtual lens image storage unit stores the virtual lens image having a negative focal length, and functioning as a concave lens.

12. The projection device according to claim 9, wherein the virtual lens image storage unit stores a plurality of the virtual lens images according to a focal length.

13. An interface device comprising:
a projector provided with a spatial light modulator including a display unit configured to display a pattern associated with a display image, a light source disposed in such a way as to irradiate emission light to the display unit of the spatial light modulator, and a projection optical system disposed on an optical path of reflected light of the emission light incident on the spatial light modulator, and configured to project projection light in which a high-order component included in the reflected light is removed;
an imaging unit configured to capture a display area of the display image, and generate image data of the display area; and
a controller configured to control the light source in such a way as to display, on the display unit of the spatial light modulator, a composite image acquired by combining a composite virtual lens image and the pattern associated with the display image, the composite virtual lens image being acquired by combining a virtual lens image for collecting the emission light incident on the display unit of the spatial light modulator in a negative direction associated with a first light collecting position and a wavefront compensation pattern for compensating a wavefront of the emission light, and irradiate the emission light to the display unit of the spatial light modulator, control the imaging unit to capture a display area of the display image, and analyze image data of the display area captured by the imaging unit,
wherein
the light source is disposed at a position where the emission light emitted from the light source lies within a plane of the display unit of the spatial light modulator; and
the virtual lens image functions as a concave lens.

14. The interface device according to claim 13, wherein the controller analyzes the image data acquired by capturing the display area, and recognizes, based on an operation content associated with a position in the display area, and a position of a pointing member included in the image data, the operation content with respect to the display image.

15. A projection method in a projection device provided with a spatial light modulator including a display unit configured to display a pattern associated with a display image, a light source disposed in such a way as to allow incidence of emission light on the display unit of the spatial light modulator, and a projection optical system disposed on an optical path of reflected light of the emission light incident on the spatial light modulator, and configured to project as projection light by removing a high-order component included in the reflected light, the projection method comprising:
generating a composite image acquired by combining a composite virtual lens image and the pattern associated with the display image, the composite virtual lens image being acquired by combining a virtual lens image for collecting the emission light incident on the display unit of the spatial light modulator in a negative direction associated with a first light collecting position and a wavefront compensation pattern for compensating a wavefront of the emission light;
displaying the generated composite image on the display unit of the spatial light modulator; and
controlling the light source in such a way as to irradiate the emission light to the display unit of the spatial light modulator
wherein
the light source is disposed at a position where the emission light emitted from the light source lies within a plane of the display unit of the spatial light modulator; and
the virtual lens image functions as a concave lens.

* * * * *